(12) United States Patent
Luo et al.

(10) Patent No.: US 11,856,582 B2
(45) Date of Patent: Dec. 26, 2023

(54) DATA TRANSMISSION METHOD AND COMMUNICATIONS APPARATUS

(71) Applicant: Huawei Technologies Co., Ltd., Shenzhen (CN)

(72) Inventors: Zhihu Luo, Beijing (CN); Jun Li, Shanghai (CN); Xiaolei Tie, Shanghai (CN); Zhe Jin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 487 days.

(21) Appl. No.: 17/171,537

(22) Filed: Feb. 9, 2021

(65) Prior Publication Data

US 2021/0168847 A1   Jun. 3, 2021

Related U.S. Application Data

(63) Continuation of application No. PCT/CN2018/100113, filed on Aug. 10, 2018.

(51) Int. Cl.
*H04W 72/23* (2023.01)
*H04L 1/1812* (2023.01)
*H04W 72/1263* (2023.01)

(52) U.S. Cl.
CPC ........... *H04W 72/23* (2023.01); *H04L 1/1819* (2013.01); *H04W 72/1263* (2013.01)

(58) Field of Classification Search
None
See application file for complete search history.

(56) References Cited

U.S. PATENT DOCUMENTS 11,382,123 B2 * 7/2022 Wang .................... H04W 72/23
2017/0223675 A1   8/2017 Dinan et al.
(Continued)

FOREIGN PATENT DOCUMENTS

CN     102045766 A    5/2011
CN     102714580 A    10/2012
(Continued)

OTHER PUBLICATIONS

3GPP TS 36.212 V15.2.1 (Jul. 2018); 3rd Generation Partnership Project; Technical Specification Group Radio Access Network; Evolved Universal Terrestrial Radio Access (E-UTRA); Multiplexing and channel coding (Release 15), 245 pages.
(Continued)

*Primary Examiner* — Anh Vu H Ly
(74) *Attorney, Agent, or Firm* — Slater Matsil, LLP

(57) ABSTRACT

This application discloses a data transmission method which includes: receiving DCI, wherein two TBs or one TB can be scheduled in the DCI, the DCI comprises a third bit, the third bit indicates that a quantity of the TB(s) scheduled in the DCI is 1 or 2, and the DCI further comprises a first bit and/or a second bit; and when the quantity of the TB(s) is 1, performing, based on the third bit, and the first bit or second bit, uplink or downlink data transmission, wherein the first or second bit indicates a NDI associated with the TB scheduled in the DCI; or when the quantity of the TB(s) is 2, performing, based on the third, first bit, and second bit, uplink or downlink data transmission, wherein the first and the second bit respectively indicate two NDIs associated with the two TBs.

20 Claims, 5 Drawing Sheets

(56) References Cited

U.S. PATENT DOCUMENTS

| | | | | |
|---|---|---|---|---|
| 2018/0092071 | A1* | 3/2018 | Dinan | H04L 1/1819 |
| 2018/0092073 | A1* | 3/2018 | Nogami | H04W 52/16 |
| 2019/0363857 | A1* | 11/2019 | Hwang | H04L 5/001 |
| 2019/0387501 | A1* | 12/2019 | Park | H04L 5/005 |
| 2021/0084639 | A1* | 3/2021 | Höglund | H04W 72/51 |
| 2021/0160860 | A1* | 5/2021 | Ko | H04L 5/0055 |
| 2021/0274526 | A1* | 9/2021 | Shin | H04L 1/1896 |
| 2021/0314925 | A1* | 10/2021 | Shin | H04L 5/0053 |
| 2021/0320755 | A1* | 10/2021 | Faxer | H04L 1/1896 |

FOREIGN PATENT DOCUMENTS

| | | |
|---|---|---|
| CN | 108243630 A | 7/2018 |
| EP | 3432636 A1 | 1/2019 |
| WO | 2017170889 A1 | 10/2017 |
| WO | 2018064583 A1 | 4/2018 |

OTHER PUBLICATIONS

3GPP TS 36.213 V15.2.0 (Jun. 2018); 3rd Generation Partnership Project; Technical Specification Group Radio Access Network; Evolved Universal Terrestrial Radio Access (E-UTRA); Physical layer procedures (Release 15); 541 pages.

Huawei et al., "Downlink signaling for LAA transmission burst related information", 3GPP TSG RAN WG1 Meeting #83, R1-156904, Anaheim, CA, US, Nov. 15-22, 2015, 10 pages.

Ericsson, "On signaling in DL LAA subframes", 3GPP TSG RAN WG1 Meeting #83, R1-157267, Anaheim, CA, US, Nov. 16-20, 2015, 5 pages.

Mediatek, "WF on LAA signaling design", 3GPP TSG RAN WG1 #83, R1-157846, Anaheim, CA, US, Nov. 15-22, 2015, 4 pages.

Huawei, "Introduction of Rel 13 feature of LAA", 3GPP TSG-RAN WG1 Meeting #83, R1-157890, Anaheim, CA, US, Nov. 15-22, 2015, 4 pages.

Ericsson, "Scheduling of multiple DL/UL transport blocks in LTE-MTC", 3GPP TSG-RAN WG1 Meeting #94, R1-1808036, Gothenburg, Sweden, Aug. 20-24, 2018, 7 pages.

Samsung, "Discussion on scheduling of multiple TBs for MTC", 3GPP TSG RAN WG1 Meeting #94, R1-1808732, Gothenburg, Sweden, Aug. 20-24, 2018, 6 pages.

Ericsson, "On new DCI format for the support of two NPDSCH HARQ processes", 3GPP TSG-RAN1#87, R1-1612787, Reno, NV, US Nov. 14-18, 2016, 6 pages.

* cited by examiner

DATA TRANSMISSION METHOD AND COMMUNICATIONS APPARATUS

CROSS-REFERENCE TO RELATED APPLICATIONS

This application is a continuation of International Application No. PCT/CN2018/100113, filed on Aug. 10, 2018, the disclosure of which is hereby incorporated by reference in its entirety.

TECHNICAL FIELD

This application relates to the field of communications technologies, and in particular, to a data transmission method and a communications apparatus.

BACKGROUND

A hybrid automatic repeat request (HARQ) is a technology combining forward error correction (FEC) and an automatic repeat request (ARQ). The HARQ exists at both a transmitting end and a receiving end of data. HARQ operations at the transmitting end include new transmission and data retransmission, and receiving and processing of a HARQ feedback. HARQ operations at the receiving end include data receiving, generation of a HARQ feedback, and the like. That is, the HARQ is classified into an uplink HARQ and a downlink HARQ. For an uplink shared channel (UL-SCH), the uplink HARQ is used to acknowledge and retransmit uplink data sent by a terminal device to a base station. For a downlink shared channel (DL-SCH), the downlink HARQ is used to acknowledge and retransmit downlink data sent by the base station to the terminal device.

In a narrowband internet of things (NB-IoT) system, two transport blocks (TB) are supported to be scheduled in one piece of downlink control information (DCI). In this way, DCI overheads can be reduced. HARQ feedback needs to be performed on each TB, so that a feedback manner of HARQ feedback of the two TBs scheduled in the piece of DCI needs to be considered.

SUMMARY

Embodiments of this application provide a data transmission method and a communications apparatus, to reduce system overheads and improve retransmission efficiency.

According to a first aspect, a data transmission method is provided. The method may be performed by a terminal device. The method includes: receiving DCI from a network device, where the DCI includes a first bit and a second bit, and the first bit and the second bit are respectively used to indicate two NDIs associated with two TBs scheduled in the DCI; and performing, based on the first bit and the second bit in the DCI, uplink data transmission or downlink data transmission in HARQ processes corresponding to the two TBs.

In this embodiment of this application, the two NDIs associated with the two TBs scheduled in one piece of DCI are carried in the DCI, so that DCI overheads are not increased as much as possible. In addition, the first bit and the second bit in the DCI are respectively used to indicate the NDIs associated with the two TBs. In other words, different NDIs are independently indicated indifferent bit indication bits. Therefore, a TB that needs to be retransmitted can be accurately distinguished, thereby improving retransmission efficiency.

In a possible design, the first bit and the second bit are bits respectively occupied by two fields in the DCI. In this solution, the first bit and the second bit belong to different fields in the DCI, and two HARQ feedbacks are directly indicated in the different fields. Because there is a clear interval between the different fields, identifiability of the first bit and the second bit can be improved to some extent, so as to accurately identify and interpret the first bit and the second bit.

In a possible design, one of the two fields is an NDI field, and the other of the two fields is a field other than the NDI field and a DCI format flag field.

In the foregoing solution, an existing NDI field in the DCI may be directly used to indicate one of the NDIs associated with the two TBs. Because the existing DCI originally includes the NDI field, the NDI field is directly reused, so that redefinition of the DCI can be reduced as much as possible. In this way, a burden of reinterpretation can be reduced as much as possible, and an accurate indication of the NDIs associated with the two TBs can also be ensured.

In a possible design, the other field is a HARQ process number field or an RV field.

In the foregoing solution, because the NDI occupies one bit, and the HARQ process number field and the RV field each also occupy one bit, an NDI other than an NDI indicated by the original NDI field may be directly and completely indicated in the HARQ process number field or the RV field, so that no additional DCI overheads are required, thereby ensuring DCI reliability.

In a possible design, the DCI includes two NDI fields, and the two fields are the two NDI fields.

In the foregoing solution, it is equivalent to that a format of the DCI is changed, but the change is an interpretation change made without changing an overall structure and a size of the DCI. This does not affect DCI reliability.

In a possible design, a format of the DCI is one of the following formats: format N0 and format N1.

In a possible design, before the DCI is received from the network device, device capability information may be further sent to the network device. The device capability information is used to indicate that the terminal device supports a scheduling manner of scheduling two TBs in one piece of DCI. Configuration information is then received from the network device. The configuration information is used to indicate that a TB scheduling manner to be applied to the terminal device is scheduling two TBs in same DCI.

In the foregoing solution, the terminal device interacts with the network device in advance. In this way, the network device may predetermine a format of the DCI to be used during TB scheduling, and the terminal device may also predetermine a DCI interpretation manner that needs to be used subsequently to interpret the DCI sent by the network device. Therefore, the terminal device can be prevented from performing blind detection on different DCI to determine an interpretation manner, thereby reducing complexity caused by the blind detection, and improving communication efficiency.

According to a second aspect, a data transmission method is provided. The method may be performed by a network device, and the method includes: determining DCI to be sent to a terminal device, where the DCI includes a first bit and a second bit, the first bit and the second bit are respectively used to indicate two new data indicators NDIs associated with two transport blocks TBs scheduled in the DCI; and sending the DCI to the terminal device.

In this embodiment of this application, the two NDIs associated with the two TBs scheduled in one piece of DCI are carried in the DCI, so that DCI overheads are not increased as much as possible. In addition, the first bit and the second bit in the DCI are respectively used to indicate the NDIs associated with the two TBs. In other words, different NDIs are independently indicated in different bit indication bits. Therefore, a TB that needs to be retransmitted can be accurately distinguished, thereby improving retransmission efficiency.

In a possible design, a TB scheduling manner to be applied to the terminal device may be first determined. The TB scheduling manner to be applied to the terminal device includes one of the following manners: scheduling two TBs in same DCI, or scheduling each of two TBs in one piece of DCI. When the TB scheduling manner to be applied to the terminal device is scheduling two TBs in same DCI, the DCI to be sent to the terminal device is determined.

In a possible design, before the TB scheduling manner to be applied to the terminal device is determined, device capability information may be first received from the terminal device. The device capability information is used to indicate that the terminal device supports the scheduling manner of scheduling two TBs in one piece of DCI. Configuration information is then sent to the terminal device. The configuration information is used to indicate that the TB scheduling manner to be applied to the terminal device is scheduling two TBs in same DCI.

In the foregoing solution, the terminal device interacts with the network device in advance. In this way, the network device may predetermine a format of the DCI to be used during TB scheduling, and the terminal device may also predetermine a DCI interpretation manner that needs to be used subsequently to interpret the DCI sent by the network device. Therefore, the terminal device can be prevented from performing blind detection on different DCI to determine an interpretation manner, thereby reducing complexity caused by the blind detection, and improving communication efficiency.

In a possible design, the first bit and the second bit are bits respectively occupied by two fields in the DCI.

In a possible design, one of the two fields is an NDI field, and the other of the two fields is a field other than the NDI field and a DCI format flag field.

In a possible design, the other field is a HARQ process number field or an RV field.

In a possible design, the DCI includes two NDI fields, and the two fields are the two NDI fields.

According to a third aspect, a data transmission method is provided. The method may be performed by a terminal device. The method includes: receiving DCI from a network device, where two transport blocks TBs or one TB can be scheduled in the DCI, the DCI includes a third bit, the third bit is used to indicate that a quantity of HARQ processes used by the TB(s) scheduled in the DCI is 1 or 2, and the DCI further includes a first bit and/or a second bit; and when the quantity of HARQ processes used by the TB(s) scheduled in the DCI is 1, performing, based on the third bit, and the first bit or the second bit in the DCI, uplink data transmission or downlink data transmission in a HARQ process corresponding to the TB scheduled by the DCI, where the first bit or the second bit is used to indicate an NDI associated with the TB scheduled in the DC. When the quantity of HARQ processes used by the TB(s) scheduled in the DCI is 2, performing, based on the third bit, the first bit, and the second bit in the DCI, uplink data transmission or downlink data transmission in HARQ processes corresponding to the TBs scheduled in the DCI, where the first bit and the second bit are respectively used to indicate two NDIs associated with the two TBs scheduled in the DCI.

In this embodiment of this application, the quantity of HARQ processes actually used by the TB(s) scheduled in the DCI can be determined by defining the third bit, so that the terminal device can determine an actual scheduling status of the network device based on the DCI, thereby improving reliability of communication between the terminal device and the network device. In addition, the NDI associated with the TB scheduled in one piece of DCI is carried in the DCI, so that DCI overheads are not increased as much as possible. In addition, the first bit and/or the second bit in the DCI are respectively used to indicate the NDIs associated with the two TBs. In other words, different NDIs are independently indicated by using different bit indication bits. Therefore, a TB that needs to be retransmitted can be accurately distinguished, thereby improving retransmission efficiency.

In a possible design, when a format of the DCI is format N0, the third bit is a bit occupied by a HARQ process number field, a subcarrier indication field, or a repetition number field in the DCI. When a format of the DCI is format N1, the third bit is a bit occupied by a HARQ process number field, a repetition number field, or a HARQ-ACK resource field in the DCI.

In the foregoing solution, the third bit is defined differently for different formats of the DCI, so that the third bit can be used in a plurality of scenarios, thereby increasing flexibility of defining the third bit.

In a possible design, when the quantity of HARQ processes used by the TB(s) scheduled in the DCI is 1, a field in which the first bit or the second bit is located is an NDI field in the DCI, and the HARQ process used by the TB scheduled in the DCI is a predetermined HARQ process.

In the foregoing solution, an existing NDI field in the DCI may be directly used to indicate one of the NDIs associated with the two TBs. Because the existing DCI originally includes the NDI field, the NDI field is directly reused, so that redefinition of the DCI can be reduced as much as possible. In this way, a burden of rewriting interpretation can be reduced as much as possible, and an accurate indication of the NDIs associated with the two TBs can also be ensured.

In a possible design, when the quantity of HARQ processes used by the TB(s) scheduled by the DCI is 1, a field in which the first bit or the second bit is located is an NDI field in the DCI, the DCI further includes a fourth bit, the fourth bit is used to indicate a process identifier of the HARQ process used by the TB scheduled in the DCI, and the fourth bit is different from the third bit.

In the foregoing solution, the fourth bit is used to indicate the HARQ process identifier of the HARQ process actually used by the TB scheduled in the DCI. In other words, the fourth bit is used to clearly indicate a specific HARQ process used by the currently scheduled TB. The fourth bit is used to indicate the HARQ process identifier of the HARQ process used by the scheduled TB, so that blind detection can be avoided, communication efficiency and reliability can be improved, network resources can be reduced, and power consumption of the terminal device can be reduced.

In a possible design, the fourth bit is a bit occupied by a field other than the NDI field, a HARQ process number field, and a DCI format flag field in the DCI.

In a possible design, when a format of the DCI is format N0, the fourth bit is a bit occupied by a redundancy version RV field or a repetition number field. When a format of the DCI is format N1, the fourth bit is a bit occupied by a repetition number field or a HARQ-ACK resource field.

In a possible design, the DCI further includes a HARQ process identifier field, and the fourth bit is a bit occupied by the HARQ process identifier field. In this way, identifiability of the fourth bit is improved.

In a possible design, when the quantity of HARQ processes used by the TB(s) scheduled in the DCI is 2, the first bit and the second bit are bits respectively occupied by two fields in the DCI.

In a possible design, one of the two fields is an NDI field, and the other of the two fields is a field other than the NDI field and a DCI format flag field.

In a possible design, when a format of the DCI is format N0, the other field is an RV field or a repetition number field. When a format of the DCI is format N1, the other field is a repetition number field or a HARQ-ACK resource field.

In a possible design, the DCI includes two NDI fields, and the two fields are the two NDI fields.

In the foregoing solution, it is equivalent to that a format of the DCI is changed, but the change is an interpretation change made without changing an overall structure and a length of the DCI. This does not affect DCI reliability. In addition, a new interpretation manner is provided, thereby increasing DCI interpretation flexibility.

In a possible design, before a TB scheduling manner to be applied to the terminal device is determined, device capability information may be further received from the terminal device. The device capability information is used to indicate that the terminal device supports a scheduling manner of scheduling two TBs in one piece of DCI. Configuration information is sent to the terminal device. The configuration information is used to indicate that the TB scheduling manner to be applied to the terminal device is scheduling two TBs in same DCI.

According to a fourth aspect, a data transmission method is provided. The method may be performed by a network device. The method includes: determining downlink control information DCI to be sent to a terminal device, and sending the DCI to the terminal device, where two transport blocks TBs or one TB can be scheduled in the DCI, the DCI includes a third bit, the third bit is used to indicate that a quantity of HARQ processes used by the TB(s) scheduled in the DCI is 1 or 2, and the DCI further includes a first bit and/or a second bit; and when the quantity of HARQ processes used by the TB(s) scheduled in the DCI is 1, the first bit or the second bit is used to indicate a new data indicator NDI associated with the TB scheduled in the DCI; or when the quantity of HARQ processes used by the TB(s) scheduled in the DCI is 2, the first bit and the second bit are respectively used to indicate two NDIs associated with the two TBs scheduled in the DCI.

In a possible design, when a format of the DCI is format N0, the third bit is a bit occupied by a HARQ process number field, a subcarrier indication field, or a repetition number field in the DCI.

When a format of the DCI is format N1, the third bit is a bit occupied by a HARQ process number field, a repetition number field, or a hybrid automatic repeat request-acknowledgement HARQ-ACK resource field in the DCI.

In a possible design, when the quantity of HARQ processes used by the TB(s) scheduled in the DCI is 1, a field in which the first bit or the second bit is located is an NDI field in the DCI, and the HARQ process used by the TB scheduled in the DCI is a predetermined HARQ process.

In a possible design, when the quantity of HARQ processes used by the TB(s) scheduled in the DCI is 1, a field in which the first bit or the second bit is located is an NDI field in the DCI, the DCI further includes a fourth bit, the fourth bit is used to indicate a process identifier of the HARQ process used by the TB scheduled in the DCI, and the fourth bit is different from the third bit.

In a possible design, the fourth bit is a bit occupied by a field other than the NDI field, a HARQ process number field, and a DCI format flag field in the DCI.

In a possible design, when a format of the DCI is format N0, the fourth bit is a bit occupied by an RV field or a repetition number field; or when a format of the DCI is format N1, the fourth bit is a bit occupied by a repetition number field or a HARQ-ACK resource field.

In a possible design, the DCI further includes a HARQ process identifier field, and the fourth bit is a bit occupied by the HARQ process identifier field.

In a possible design, when the quantity of HARQ processes used by the TB(s) scheduled in the DCI is 2, the first bit and the second bit are bits respectively occupied by two fields in the DCI.

In a possible design, one of the two fields is an NDI field, and the other of the two fields is a field other than the NDI field and a DCI format flag field.

In a possible design, when a format of the DCI is format N0, the other field is an RV field or a repetition number field; or when a format of the DCI is format N1, the other field is a repetition number field or a HARQ-ACK resource field.

In a possible design, the DCI includes two NDI fields, and the two fields are the two NDI fields.

In a possible design, before downlink control information DCI to be sent to a terminal device is determined, the method further includes: determining that a TB scheduling manner to be applied to the terminal device is scheduling two TBs in same DCI.

According to a fifth aspect, a data transmission method is provided. The method may be performed by a terminal device. The method includes: receiving DCI from a network device, where two transport blocks TBs or one TB can be scheduled in the DCI, the DCI includes a third bit, the third bit is used to indicate that a quantity of TBs scheduled in the DCI is 1 or 2, and the DCI further includes a first bit and/or a second bit; and when the quantity of TBs scheduled in the DCI is 1, performing, based on the third bit, and the first bit or the second bit in the DCI, uplink data transmission or downlink data transmission in a HARQ process corresponding to the TB scheduled in the DCI, where the first bit or the second bit is used to indicate an NDI associated with the TB scheduled in the DCI. When the quantity of TBs scheduled in the DCI is 2, performing, based on the third bit, the first bit, and the second bit in the DCI, uplink data transmission or downlink data transmission in HARQ processes corresponding to the TBs scheduled in the DCI, where the first bit and the second bit are respectively used to indicate two NDIs associated with the two TBs scheduled in the DCI.

In this embodiment of this application, the quantity of TBs scheduled in the DCI can be determined by defining the third bit, so that the terminal device can determine an actual scheduling status of the network device based on the DCI, thereby improving reliability of communication between the terminal device and the network device. In addition, the NDI associated with the TB scheduled in one piece of DCI is carried in the DCI, so that DCI overheads are not increased as much as possible. In addition, the first bit and/or the second bit in the DCI are respectively used to indicate the NDIs associated with the two TBs. In other words, different NDIs are independently indicated in different bit indication bits. Therefore, a TB that needs to be retransmitted can be accurately distinguished, thereby improving retransmission efficiency.

In a possible design, when a format of the DCI is format N0, the third bit is a bit occupied by a HARQ process number field, a subcarrier indication field, or a repetition number field in the DCI. When a format of the DCI is format N1, the third bit is a bit occupied by a HARQ process number field, a repetition number field, or a HARQ-ACK resource field in the DCI.

In the foregoing solution, the third bit is defined differently for different formats of the DCI, so that the third bit can be used in a plurality of scenarios, thereby increasing flexibility of defining the third bit.

In a possible design, when the quantity of TBs scheduled in the DCI is 1, a field in which the first bit or the second bit is located is an NDI field in the DCI, and a transmission resource location of the TB scheduled in the DCI is a predetermined transmission resource location.

In the foregoing solution, an existing NDI field in the DCI may be directly used to indicate one of the NDIs associated with the two TBs. Because the existing DCI originally includes the NDI field, the NDI field is directly reused, so that redefinition of the DCI can be reduced as much as possible. In this way, a burden of rewriting interpretation can be reduced as much as possible, and an accurate indication of the NDIs associated with the two TBs can also be ensured.

In a possible design, when the quantity of TBs scheduled in the DCI is 1, a field in which the first bit or the second bit is located is an NDI field in the DCI, the DCI further includes a fourth bit, the fourth bit is used to indicate a transmission resource location of the TB scheduled in the DCI or indicate a transport block identifier of the TB scheduled in the DCI, and the fourth bit is different from the third bit.

In the foregoing solution, the fourth bit is used, so that blind detection can be avoided, communication efficiency and reliability can be improved, network resources can be reduced, and power consumption of the terminal device can be reduced.

In a possible design, the fourth bit is a bit occupied by a field other than the NDI field, a HARQ process number field, and a DCI format flag field in the DCI.

In a possible design, when a format of the DCI is format N0, the fourth bit is a bit occupied by an RV field or a repetition number field. When a format of the DCI is format N1, the fourth bit is a bit occupied by a repetition number field or a HARQ-ACK resource field.

In a possible design, the DCI further includes a transmission resource location indication field, and the fourth bit is a bit occupied by the transmission resource location indication field.

In a possible design, when the quantity of TBs scheduled in the DCI is 2, the first bit and the second bit are bits respectively occupied by two fields in the DCI.

In a possible design, one of the two fields is an NDI field, and the other of the two fields is a field other than the NDI field and a DCI format flag field.

In a possible design, when a format of the DCI is format N0, the other field is an RV field or a repetition number field. When a format of the DCI is format N1, the other field is a repetition number field or a HARQ-ACK resource field.

In a possible design, the DCI includes two NDI fields, and the two fields are the two NDI fields.

In the foregoing solution, it is equivalent to that a format of the DCI is changed, but the change is an interpretation change made without changing an overall structure and a length of the DCI. This does not affect DCI reliability. In addition, a new interpretation manner is provided, thereby increasing DCI interpretation flexibility.

In a possible design, before a TB scheduling manner to be applied to the terminal device is determined, device capability information may be further received from the terminal device. The device capability information is used to indicate that the terminal device supports a scheduling manner of scheduling two TBs in one piece of DCI. Configuration information is sent to the terminal device. The configuration information is used to indicate that the TB scheduling manner to be applied to the terminal device is scheduling two TBs in same DCI.

According to a sixth aspect, a data transmission method is provided. The method may be performed by a network device. The method includes: determining downlink control information DCI to be sent to a terminal device, and sending the DCI to the terminal device, where two transport blocks TBs or one TB can be scheduled in the DCI, the DCI includes a third bit, the third bit is used to indicate that a quantity of TBs scheduled in the DCI is 1 or 2, and the DCI further includes a first bit and/or a second bit; and when the quantity of TBs scheduled in the DCI is 1, the first bit or the second bit is used to indicate a new data indicator NDI associated with the TB scheduled in the DCI; or when the quantity of TBs scheduled in the DCI is 2, the first bit and the second bit are respectively used to indicate two NDIs associated with the two TBs scheduled in the DCI.

In a possible design, when a format of the DCI is format N0, the third bit is a bit occupied by a HARQ process number field, a subcarrier indication field, or a repetition number field in the DCI. When a format of the DCI is format N1, the third bit is a bit occupied by a HARQ process number field, a repetition number field, or a HARQ-ACK resource field in the DCI.

In a possible design, when the quantity of TBs scheduled in the DCI is 1, a field in which the first bit or the second bit is located is an NDI field in the DCI, and a transmission resource location of the TB scheduled in the DCI is a predetermined transmission resource location.

In a possible design, when the quantity of TBs scheduled in the DCI is 1, a field in which the first bit or the second bit is located is an NDI field in the DCI, the DCI further includes a fourth bit, the fourth bit is used to indicate a transmission resource location of the TB scheduled in the DCI or indicate a transport block identifier of the TB scheduled in the DCI, and the fourth bit is different from the third bit.

In a possible design, the fourth bit is a bit occupied by a field other than the NDI field, a HARQ process number field, and a DCI format flag field in the DCI.

In a possible design, when a format of the DCI is format N0, the fourth bit is a bit occupied by an RV field or a repetition number field. When a format of the DCI is format N1, the fourth bit is a bit occupied by a repetition number field or a HARQ-ACK resource field.

In a possible design, the DCI further includes a transmission resource location indication field, and the fourth bit is a bit occupied by the transmission resource location indication field.

In a possible design, when the quantity of TBs scheduled in the DCI is 2, the first bit and the second bit are bits respectively occupied by two fields in the DCI.

In a possible design, one of the two fields is an NDI field, and the other of the two fields is a field other than the NDI field and a DCI format flag field.

In a possible design, when a format of the DCI is format N0, the other field is an RV field or a repetition number field; or when a format of the DCI is format N1, the other field is a repetition number field or a HARQ-ACK resource field.

In a possible design, the DCI includes two NDI fields, and the two fields are the two NDI fields.

In a possible design, before a TB scheduling manner to be applied to the terminal device is determined, device capability information may be further received from the terminal device. The device capability information is used to indicate that the terminal device supports a scheduling manner of scheduling two TBs in one piece of DCI. Configuration information is sent to the terminal device. The configuration information is used to indicate that the TB scheduling manner to be applied to the terminal device is scheduling two TBs in same DCI.

According to a seventh aspect, a communications apparatus is provided. The communications apparatus may be a terminal device, or may be an apparatus in a terminal device. The apparatus may include a processing module and a receiving module. The modules may perform corresponding functions performed by the terminal device in any design example of the first aspect.

According to an eighth aspect, a communications apparatus is provided. The communications apparatus may be a network device, or may be an apparatus in a network device. The apparatus may include a processing module and a sending module. The modules may perform corresponding functions performed by the network device in any design example of the second aspect.

According to a ninth aspect, a communications apparatus is provided. The communications apparatus may be a terminal device, or may be an apparatus in a terminal device. The apparatus may include a processing module and a receiving module. The modules may perform corresponding functions performed by the terminal device in any design example of the third aspect.

According to a tenth aspect, a communications apparatus is provided. The communications apparatus may be a network device, or may be an apparatus in a network device. The apparatus may include a processing module and a sending module. The modules may perform corresponding functions performed by the network device in any design example of the fourth aspect.

According to an eleventh aspect, a communications apparatus is provided. The communications apparatus may be a terminal device, or may be an apparatus in a terminal device. The apparatus may include a processing module and a receiving module. The modules may perform corresponding functions performed by the terminal device in any design example of the fifth aspect.

According to a twelfth aspect, a communications apparatus is provided. The communications apparatus may be a network device, or may be an apparatus in a network device. The apparatus may include a processing module and a sending module. The modules may perform corresponding functions performed by the network device in any design example of the sixth aspect.

According to a thirteenth aspect, a communications apparatus is provided. The communications apparatus may be a terminal device. The apparatus includes a processor, configured to implement the method described in the first aspect, the third aspect, or the fifth aspect. The apparatus may further include a memory, configured to store a program instruction and data. The memory is coupled to the processor. The processor may invoke and execute the program instruction stored in the memory, to implement any one of the methods described in the first aspect, the third aspect, or the fifth aspect. The apparatus may further include a communications interface. The communications interface is used by the apparatus to communicate with another device. For example, the another device is a network device.

According to a fourteenth aspect, a communications apparatus is provided. The communications apparatus may be a network device. The apparatus includes a processor, configured to implement the method described in the second aspect, the fourth aspect, or the sixth aspect. The apparatus may further include a memory, configured to store a program instruction and data. The memory is coupled to the processor. The processor may invoke and execute the program instruction stored in the memory, to implement any one of the methods described in the second aspect, the fourth aspect, or the sixth aspect. The apparatus may further include a communications interface. The communications interface is used by the apparatus to communicate with another device. For example, the another device is a terminal device.

According to a fifteenth aspect, an embodiment of this application further provides a computer-readable storage medium, including an instruction. When the instruction is run on a computer, the computer is enabled to perform the method according to the first aspect, the third aspect, or the fifth aspect.

According to a sixteenth aspect, an embodiment of this application further provides a computer-readable storage medium, including an instruction. When the instruction is run on a computer, the computer is enabled to perform the method according to the second aspect, the fourth aspect, or the sixth aspect.

According to a seventeenth aspect, an embodiment of this application provides a chip system. The chip system includes a processor, and may further include a memory. The chip system is configured to implement the method according to the first aspect, the third aspect, or the fifth aspect. The chip system may include a chip, or may include a chip and another discrete component.

According to an eighteenth aspect, an embodiment of this application provides a chip system. The chip system includes a processor, and may further include a memory. The chip system is configured to implement the method according to the second aspect, the fourth aspect, or the sixth aspect. The chip system may include a chip, or may include a chip and another discrete component.

According to a nineteenth aspect, an embodiment of this application provides a communications system. The communications system includes the communications apparatus according to the seventh aspect and the communications apparatus according to the eighth aspect.

According to a twentieth aspect, an embodiment of this application provides a system. The system includes the communications apparatus according to the ninth aspect and the communications apparatus according to the tenth aspect.

According to a twenty-first aspect, an embodiment of this application provides a system. The system includes the communications apparatus according to the eleventh aspect and the communications apparatus according to the twelfth aspect.

According to a twenty-second aspect, a computer program product including an instruction is provided. The computer program product stores the instruction, and when the computer program product runs on a computer, the computer is enabled to perform the method according to the first aspect, the third aspect, or the fifth aspect.

According to a twenty-third aspect, a computer program product including an instruction is provided. The computer program product stores the instruction, and when the computer program product runs on a computer, the computer is enabled to perform the method according to the second aspect, the fourth aspect, or the sixth aspect.

BRIEF DESCRIPTION OF THE DRAWINGS

To describe technical solutions in embodiments of this application or in the conventional technology more clearly, the following briefly describes the accompanying drawings used in describing the embodiments of this application or the conventional technology. It is clear that the accompanying drawings in the following descriptions show only the embodiments of this application, and a person of ordinary skill in the art may still derive other drawings from the provided accompanying drawings without creative efforts.

DETAILED DESCRIPTION OF ILLUSTRATIVE EMBODIMENTS

Figure 1:
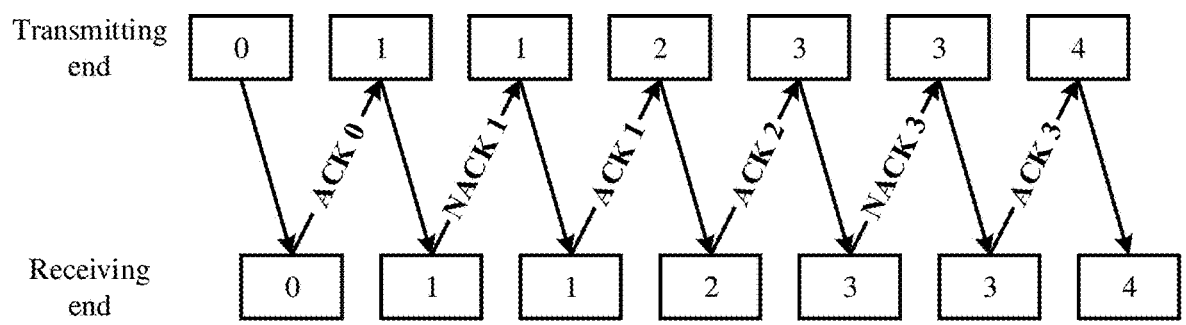
FIG. 1 is a schematic diagram of a stop and wait mechanism of a HARQ process.

To make objectives, technical solutions and advantages of embodiments of this application clearer, the following further describes the embodiments of this application in detail with reference to the accompanying drawings.

The following describes some terms in the embodiments of this application, to facilitate understanding of a person skilled in the art.

1. A terminal device includes a device that provides a user with voice and/or data connectivity, for example, may include a handheld device having a wireless connection function, or a processing device connected to a wireless modem. The terminal device may communicate with a core network through a radio access network (RAN), and exchange a voice and/or data with the RAN. The terminal device may include user equipment (UE), a wireless terminal device, a mobile terminal device, a subscriber unit, a subscriber station, a mobile station, a mobile, a remote station, an access point (AP), a remote terminal device (remote terminal), an access terminal device (access terminal), a user terminal device (user terminal), a user agent, a user apparatus (user device), and the like. For example, the terminal device may include a mobile phone (which is also referred to as a "cellular" phone), a computer having a mobile terminal device, a portable, pocket-sized, handheld, computer built-in, or in-vehicle mobile apparatus, and a smart wearable device. For example, the terminal device is a device such as a personal communications service (PCS) phone, a cordless phone, a session initiation protocol (SIP) phone, a wireless local loop (WLL) station, or a personal digital assistant (PDA). The terminal device further includes a limited device, for example, a device with low power consumption, a device with a limited storage capability, or a device with a limited computing capability. For example, the terminal device may be an information sensing device, for example, a barcode, radio frequency identification (RFID), a sensor, a global positioning system (GPS), or a laser scanner.

As an example instead of a limitation, in the embodiments of this application, the terminal device may alternatively be a wearable device. The wearable device may also be referred to as a wearable intelligent device, and is a general term of wearable devices, such as glasses, gloves, watches, clothes, and shoes, that are developed by applying wearable technologies in intelligent designs of daily wear. The wearable device is a portable device that can be directly worn on a body or integrated into clothes or an accessory of a user. The wearable device is not merely a hardware device, but is used to implement a powerful function through software support, data interaction, and cloud interaction. In a broader sense, the wearable intelligent device is full-featured, has a large size, and can implement all or some functions without depending on a smartphone. For example, the wearable intelligent device is a smart watch or smart glasses. Alternatively, the wearable intelligent device focuses only on a specific application function and needs to be used with another device such as a smartphone. For example, the wearable intelligent device is a smart wristband, a smart helmet, or smart jewelry for physical sign monitoring.

2. A network device includes, for example, an access network (access network, AN) device and a core network device. The access network device, for example, a base station (for example, an access point), may be a device that is in an access network and that communicates with a wireless terminal device over an air interface through one or more cells. The network device may be configured to: mutually convert a received over-the-air frame and an internet protocol (IP) packet, and serve as a router between the terminal device and a rest portion of the access network. The rest portion of the access network may include an IP network. The network device may coordinate attribute management of the air interface. For example, the network device may include an evolved NodeB (NodeB, or eNB, or eNodeB, evolutional Node B) in a long term evolution (LTE) system or an LTE-advanced (LTE-A) system, or may include a next generation NodeB (next generation node B, gNB) in a 5th generation (fifth generation, 5G) mobile communications technology new radio (NR) system, or may include a central unit (CU) and a distributed unit (DU) in a cloud access network (CloudRAN) system. This is not limited in the embodiments of this application.

In the LTE system, the core network device is, for example, a mobility management entity (MME). In the NR system, the core network device is, for example, an access and mobility management function (AMF) entity.

3. NB-IoT: Currently, the 3rd generation partnership project (3GPP) standard focuses on carrying an IoT service based on a cellular network by designing a new air interface and fully using a characteristic of a narrowband technology. This type of IoT is referred to as an NB-IoT. Compared with a conventional cellular network, a service and a terminal device in an NB-IoT system have the following features.

(1) Low service rate and long service periodicity: Compared with the conventional cellular network, an NB-IoT service generates smaller data packets, and is usually delay tolerant.

(2) Massive-connection requirement: One NB-IoT base station may cover a large quantity of internet of things terminal devices such as smart water/electricity meters, smart households, vehicles, and wearable devices that are massively deployed. For example, a quantity of the terminal devices may exceed tens of thousands.

(3) Low-cost requirement: Compared with an existing cellular network terminal device, the NB-IoT system requires a lower-cost terminal device, to implement massive deployment of terminal devices. A low-cost requirement requires that implementation complexity of the terminal device is also very low.

(4) Low power consumption requirement: The NB-IoT system requires lower power consumption of the terminal device, to save battery power of the terminal device, and ensure that the terminal device has an extra-long standby time, so as to reduce labor costs of battery replacement.

4. A HARQ, namely, a hybrid automatic repeat request, is a technology that combines forward error correction (FEC) and an automatic repeat request (ARQ). In the FEC, redundant information is added, so that a receiving end can correct some errors, thereby reducing a quantity of retransmissions. For an error that cannot be corrected through the FEC, the receiving end requests, in an ARQ mechanism, a transmitting end to retransmit data. The receiving end uses an error-detection code that is usually a cyclic redundancy check (CRC) code, to detect whether an error occurs in received data. If the receiving end does not detect an error, the receiving end sends an acknowledgement (ACK) to the transmitting end. After receiving the ACK, the transmitting end sends a next data packet. If the receiving end detects an error, the receiving end sends a negative acknowledgement (NACK) to the transmitting end. After receiving the NACK, the transmitting end retransmits the data.

Figure 2:
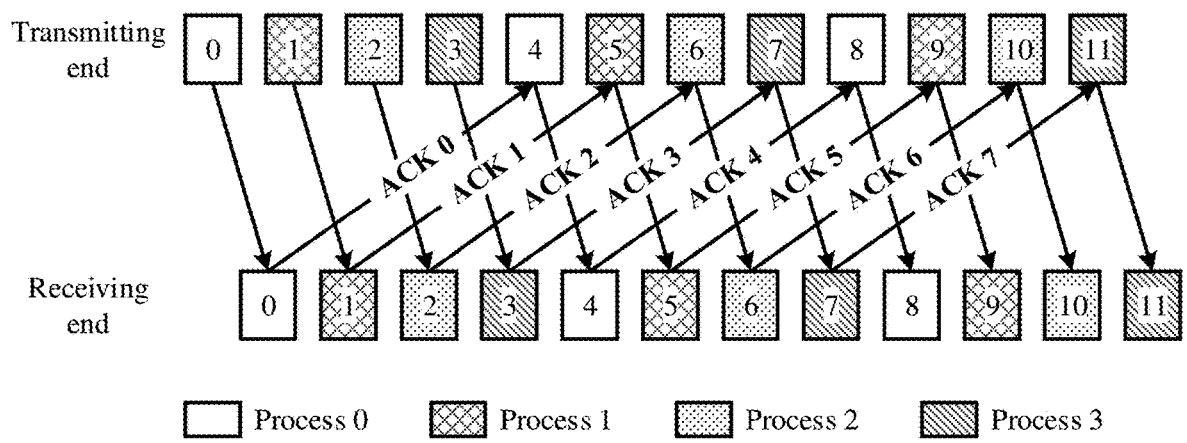
FIG. 2 is a schematic diagram of a stop and wait mechanism of four parallel HARQ processes.

In the HARQ, data is sent in a stop and wait mechanism. Referring to FIG. 1, in the stop and wait mechanism, after sending a data packet, the transmitting end stops to wait for acknowledgement information, and the transmitting end sends a data packet after receiving a HARQ feedback. A receiving end uses 1-bit (bit) information to feed back an acknowledgement (ACK) or a negative acknowledgement (NACK) based on a receiving status of the data packet. After receiving the NACK, the transmitting end retransmits the data packet. After receiving the ACK, the transmitting end sends a new data packet. However, after each transmission, the transmitting end needs to stop to wait for a feedback. During the feedback waiting period, a channel is idle, and no data is sent. Consequently, a relatively low throughput is caused. In view of this, a plurality of parallel stop and wait processes may be used. To be specific, when acknowledgement information is waited for in a HARQ process, the transmitting end may continue to send data in another HARQ process. For example, four HARQ processes running in parallel are shown in FIG. 2.

5. In the embodiments of this application, terms "system" and "network" may be used interchangeably, and terms "field" and "domain" may be used interchangeably. "A plurality of" means two or more. In view of this, "a plurality of" may also be understood as "at least two" in the embodiments of this application. "At least one" may be understood as one or more, for example, understood as one, two, or more. For example, including at least one means including one, two, or more, and does not limit what are included. For example, including at least one of A, B, and C may represent the following cases: A is included, B is included, C is included, A and B are included, A and C are included, B and C are included, or A and B and C are included. "At least two" may be understood as two or more. Similarly, an understanding of descriptions such as "at least one type" is similar. The term "and/or" describes an association relationship between associated objects and represents that three relationships may exist. For example, A and/or B may represent the following three cases: Only A exists, both A and B exist, and only B exists. In addition, unless otherwise specified, the character "/" usually indicates an "or" relationship between the associated objects.

In addition, unless otherwise stated, in the embodiments of this application, ordinal numbers such as "first", "second", "third", and "fourth" are used to distinguish between a plurality of objects, and not intended to limit a sequence, a time sequence, priorities, or importance of the plurality of objects. For example, terms "second bit" and "third bit" are merely used to distinguish between different bits, and do not indicate different content actually indicated by the bits, different priorities, different importance, or the like.

The embodiments of this application may be applicable to an NB-IoT system, or may be applicable to another similar communications system, for example, an LTE system or an LTE-A system.

To better understand the technical solutions provided in the embodiments of this application, the following describes the technical background of the embodiments of this application.

A new data indicator (NDI) field is carried in DCI as HARQ information, and is used to indicate whether currently scheduled transmission is new transmission or retransmission. Currently, in each HARQ process, a scheduling manner of scheduling one TB in one piece of DCI is used. Currently, one piece of DCI includes only one NDI field. If an NDI in the DCI is toggled compared with an NDI in DCI for performing previous scheduling, it indicates that the currently scheduled transmission is new transmission. If an NDI in the DCI is not toggled compared with an NDI in DCI for performing previous scheduling, it indicates that the currently scheduled transmission is retransmission.

Currently, in an NB-IoT system, to reduce DCI overheads, two TBs may be scheduled in one piece of DCI. For uplink transmission, a HARQ feedback of a TB is indicated based on the NDI in the DCI. Therefore, the HARQ feedback of the TB may be indicated based on the NDI in the DCI. After a terminal device receives the DCI, if an NDI field in the DCI is toggled compared with an NDI field in DCI for performing previous scheduling, it indicates that transmission of a previously scheduled TB succeeds, and new transmission is scheduled this time. If an NDI field in the DCI is not toggled compared with an NDI field in DCI for performing previous scheduling, it indicates that transmission of a previously scheduled TB fails, and retransmission is scheduled this time. For downlink transmission, the DCI also needs to include the NDI field, to indicate new transmission or retransmission. When one piece of DCI is used to schedule two TBs, how to indicate NDIs associated with the two TBs needs to be specified.

For the foregoing problem, in a common feedback manner, there is only one NDI field in the DCI, and the NDI field usually occupies one bit. For the two TBs, if the manner is used, two pieces of DCI are required to carry NDIs associated with the two TBs. However, such a feedback manner requires relatively high DCI overheads. To reduce the DCI overheads, for example, a field is added to an existing format of the DCI, to carry the NDIs associated with the two TBs. However, this synchronization indication manner increases a length of the DCI, and affects DCI reliability. On this basis, for example, another synchronization indication manner may be used. Specifically, one bit in one piece of DCI is used to jointly indicate the NDIs associated with the two TBs. In other words, one bit in one piece of DCI is used to simultaneously carry the NDIs associated with the two TBs. For example, in a specific manner, after an AND operation is performed on the NDIs associated with the two TBs, joint indication is performed by using the bit in the DCI. It is assumed that the two TBs are a TB 1 and a TB 2. Because the NDIs associated with the two TBs may be 0 or 1, after the AND operation is performed on the NDIs associated with the two TBs, there may be two joint indication results: 0 and 1. When the joint indication result is 0, there may be three cases: $0_1\&0_2=$, $0_1\&1_2=0$, and $1_1\&0_2=0$. $0_1$ indicates that an NDI associated with the TB 1 is 0, $0_2$ indicates that an NDI associated with the TB 2 is 0, and $1_2$ indicates that the NDI associated with the TB 2 is 0. However, in practice, a specific case is unknown. That is, joint indication results corresponding to three cases are all 0. However, in practice, a specific one of the three cases is unknown. It can be learned that, when a joint indication result indicates that retransmission needs to be performed, whether one of the TBs needs to be retransmitted or both the TBs need to be retransmitted cannot be identified in a joint indication manner. Even if it is known that one of the TBs needs to be retransmitted, it cannot be identified which TB needs to be retransmitted. Consequently, accuracy of retransmission determining is low. In addition, to ensure transmission reliability, when the joint indication result of 0 (which means that retransmission is required) is obtained, both the two TBs are simultaneously retransmitted. However, in practice, only one of the TBs may need to be retransmitted. Consequently, repeated data transmission may be caused; in other words, retransmission efficiency is relatively low, and transmission resources of a system are wasted.

In view of this, an embodiment of this application provides a data transmission method. In this embodiment of this application, one piece of DCI is used to carry NDIs corresponding to two HARQ feedbacks of two TBs, so that DCI overheads can be reduced. In addition, the two NDIs associated with the two TBs scheduled in one piece of DCI are independently indicated by two bits in the DCI, so that effectiveness and accuracy of synchronous feedback of the two HARQ feedbacks can be improved.

Figure 3:
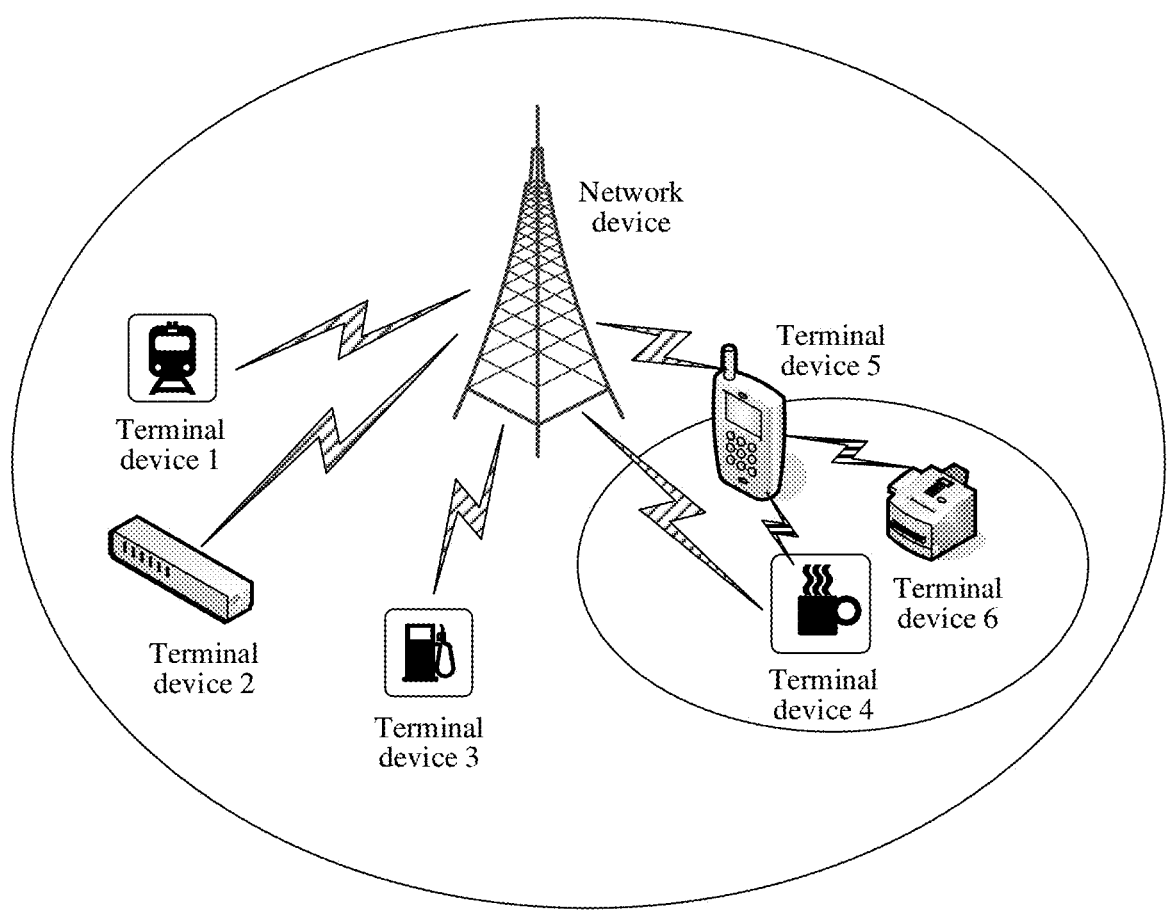
FIG. 3 is a schematic diagram of an application scenario according to an embodiment of this application.

The technical background of the embodiments of this application is described above. FIG. 3 is a schematic diagram of an application scenario according to an embodiment of this application.

FIG. 3 includes a network device and a plurality of terminal devices. The network device and terminal devices 1 to 6 form a communications system. In the communications system, the network device may send information to each terminal device. Correspondingly, each terminal device may also send information to the network device. In addition, the terminal devices 4 to 6 may also form a communications system. In the communications system, the terminal device 5 may send information to either or both of the terminal device 4 and the terminal device 6. In this embodiment of this application, the terminal devices in the communications system shown in FIG. 3 may include, for example, devices such as a mobile phone, a television, a gas station device, a printer, a car, a refrigerator, and an air conditioner. These terminal devices may be terminal devices in an NB-IoT system, or may be terminal devices in another system (for example, an LTE system or an LTE-A system).

The following describes the technical solutions provided in the embodiments of this application with reference to the accompanying drawings.

Figure 4:
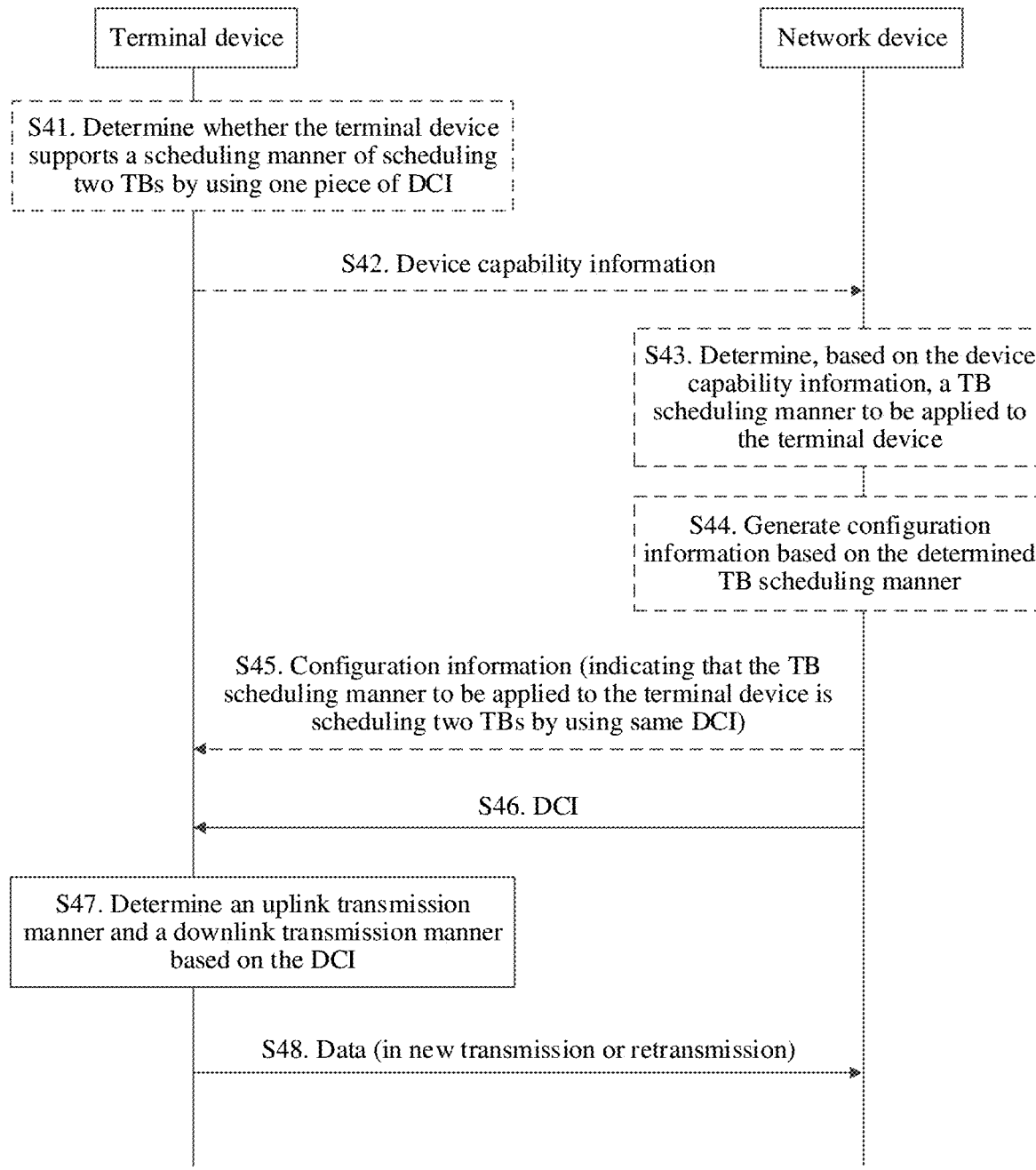
FIG. 4 is a flowchart of a data transmission method according to an embodiment of this application.

Referring to FIG. 4, an embodiment of this application provides a data transmission method, and a procedure of the method is described as follows:

S41. A terminal device determines whether the terminal device supports a scheduling manner of scheduling two TBs in one piece of DCI.

Different terminal devices may have different device capabilities. For example, some terminal devices can support a scheduling manner of scheduling two TBs or a plurality of TBs in one piece of DCI, and some terminal devices may support only a scheduling manner of scheduling one TB in one piece of DCI. Therefore, for a terminal device, before exchanging information with a network device, the terminal device may first report a capability of the terminal device to the network device, so that the network device allocates a corresponding system resource to the terminal device based on an actual device capability of the terminal device, and schedules DCI in a scheduling manner that can be identified and processed by the terminal device. Therefore, after obtaining the DCI sent by the network device, the terminal device can correctly interpret the DCI, and complete a subsequent service based on a correct interpretation result. In addition, one TB scheduled in the DCI may use one HARQ process. For example, two TBs scheduled in the DCI may use two different HARQ processes. Alternatively, two TBs scheduled in the DCI may use a same HARQ process. In other words, a quantity of TBs scheduled in the DCI and a quantity of HARQ processes used by the scheduled TBs may be in a one-to-one correspondence, or two or more TBs may correspond to a same HARQ process. This is not limited in this embodiment of this application.

Therefore, before reporting the device capability of the terminal device to the network device, the terminal device needs to first determine an actual device capability of the terminal device. In this embodiment of this application, the terminal device may determine whether the terminal device supports the scheduling manner of scheduling two TBs in one piece of DCI. After performing determining, the terminal device may generate device capability information. Based on different determining results, the device capability information may include indication information used to indicate whether the terminal device can support the scheduling manner of scheduling two TBs in one piece of DCI. In other words, the indication information may be used to determine whether the terminal device can support the scheduling manner of scheduling two TBs in one piece of DCI.

It should be noted that the device capability information in this embodiment of this application may indicate at least whether the terminal device can support the scheduling manner of scheduling two TBs in one piece of DCI. On this basis, the device capability information in this embodiment of this application may be further used to indicate another capability of the terminal device. Details are not described herein.

S42. The terminal device sends the device capability information to the network device, and the network device may receive the device capability information sent by the terminal device.

Further, after generating the device capability information, the terminal device may send the device capability information to the network device, to report the current actual device capability of the terminal device to the network device by using the device capability information.

S43. The network device determines, based on the received device capability information, whether the terminal device supports the scheduling manner of scheduling two TBs in one piece of DCI, and further determines a TB scheduling manner to be applied to the terminal device.

Because the device capability information can indicate whether the terminal device supports the scheduling manner of scheduling two TBs in one piece of DCI, after receiving the device capability information sent by the terminal device, the network device may determine, based on the device capability information, whether the terminal device supports the scheduling manner of scheduling two TBs in one piece of DCI. Alternatively, the network device may determine, based on a current network resource occupation status or a current network load status, whether the terminal device supports scheduling two TBs in one piece of DCI. The network device then determines, based on a determining result, the TB scheduling manner to be applied to the terminal device.

In this embodiment of this application, different TB scheduling manners correspond to different DCI interpretation manners. Specifically, when one TB is scheduled in one piece of DCI, because the one piece of DCI includes one NDI field, the existing NDI field may be used to indicate a HARQ feedback corresponding to the TB. To be specific, in the scheduling manner of scheduling one TB in one piece of DCI, the terminal device may interpret, in an existing DCI interpretation manner, the DCI sent by the network device. When one piece of DCI is used to schedule two TBs, because original DCI includes only one NDI field, this embodiment of this application provides a new DCI interpretation manner, to simultaneously and accurately indicate NDIs associated with the two TBs. To be specific, in the scheduling manner of simultaneously scheduling two TBs in one piece of DCI, the terminal device may interpret, in the new DCI interpretation manner provided in this embodiment of this application, the DCI sent by the network device. The new DCI interpretation manner used when two TBs are scheduled in one piece of DCI is described in detail in the following.

The following describes two cases in which the network device performs determining based on the device capability information sent by the terminal device.

In a first case, when determining, based on the device capability information, that the terminal device does not support the scheduling manner of scheduling two TBs in one piece of DCI, the network device may continue to communicate with the terminal device in the scheduling manner of scheduling one TB in one piece of DCI. Because scheduling one TB in one piece of DCI is a relatively mature technology, a current terminal device usually supports the scheduling manner. Consequently, when it is determined that the terminal device does not support the scheduling manner of scheduling two TBs in one piece of DCI, it indicates that the terminal device can interpret, only in the existing DCI interpretation manner, the DCI sent by the network device. Therefore, to ensure that the terminal device can correctly interpret the DCI sent by the network device, the network device still interacts with the terminal device in an original scheduling manner (to be specific, one TB is scheduled in one piece of DCI), to ensure system reliability.

In a second case, when it is determined, based on the device capability information, that the terminal device supports the scheduling manner of scheduling two TBs in one piece of DCI, the network device may select, from two selection manners, the TB scheduling manner to be applied to the terminal device. In a possible selection manner, the scheduling manner of scheduling two TBs in one piece of DCI is applied to the terminal device. In another possible selection manner, the original scheduling manner (to be specific, one TB is scheduled in one piece of DCI) is still applied to the terminal device.

For the second case, in a specific implementation process, a specific scheduling manner selected as the scheduling manner to be applied to the terminal device may be selected, for example, according to the following policies.

(1) Selection may be performed based on a request of the terminal device. For example, the terminal device may request an available TB scheduling manner from the network device based on the actual device capability of the terminal device. In this case, the network device may select a corresponding TB scheduling manner based on an actual request of the terminal device.

(2) Selection may be performed based on an agreement between the terminal device and the network device. For example, the agreement between the terminal device and the network device is that the original TB scheduling manner (to be specific, one TB is scheduled in one piece of DCI) is used by default, or the new TB scheduling manner (to be specific, the TB scheduling manner of scheduling two TBs in one piece of DCI) is used by default. Therefore, the network device may directly perform selection based on the agreement.

(3) Selection may be flexibly performed based on a current resource usage of a system. For example, a current system is relatively idle, and system overheads are relatively low. In this case, the network device may use the original TB scheduling manner, to be specific, one TB is scheduled in one piece of DCI, to implement scheduling between the DCI and the TB in a one-to-one correspondence. For another example, the current system is relatively busy. To reduce system overheads as much as possible and ensure system transmission reliability, the TB scheduling manner of scheduling two TBs in one piece of DCI may be used this time. In this manner in which the selection may be flexibly performed based on the current resource usage of the system, system resources can be more properly allocated, and system reliability can be ensured as much as possible.

S44. The network device generates configuration information based on the determined TB scheduling manner to be applied to the terminal device.

After determining, in the manner described above, the TB scheduling manner to be applied to the terminal device, the network device generates the configuration information based on the determined manner. The configuration information is used to indicate a specific TB scheduling manner to be applied to the terminal device. For example, in this embodiment of this application, the configuration information is used to indicate that the TB scheduling manner to be applied to the terminal device is scheduling two TBs in one piece of DCI. It is equivalent to that after determining the actual device capability of the terminal device, the network device returns a feedback to the terminal device, to notify the terminal device that the network device learns of the actual device capability of the terminal device, and further schedules the TBs in the DCI that can be interpreted by the terminal device.

S45. The network device sends the generated configuration information to the terminal device, and the terminal device receives the configuration information.

After obtaining the configuration information, the terminal device may determine, based on the configuration information, the TB scheduling manner to be used by the terminal device. For example, the terminal device determines that the TB scheduling manner to be used by the terminal device is scheduling two TBs in one piece of DCI. In this case, after the DCI sent by the network device is subsequently obtained, the received DCI may be interpreted in the new DCI interpretation manner mentioned above.

The foregoing S41 to S45 may be performed in a process in which the terminal device establishes a radio resource control (radio resource control, RRC) connection. To be specific, the terminal device may report the actual device capability of the terminal device to the network device in the process of establishing the RRC connection, and the network device may send the generated configuration information to the terminal device by using RRC higher layer signaling. In this case, after entering an RRC connected mode, the terminal device may correspondingly interpret, based on the TB scheduling manner indicated by the network device, the DCI sent by the network device, to ensure reliability of communication between the terminal device and the network device.

In addition, the terminal device interacts with the network device in advance. In this way, the network device may predetermine a format of the DCI to be used during TB scheduling, and the terminal device may also predetermine a DCI interpretation manner that needs to be used subsequently to interpret the DCI sent by the network device. Therefore, the terminal device can be prevented from performing blind detection on different DCI to determine an interpretation manner, thereby reducing complexity caused by the blind detection, and improving communication efficiency.

In addition, it should be noted that the foregoing S41 to S45 may not be mandatory steps. In other words, the foregoing S41 to S45 are all optional steps in this embodiment of this application. Therefore, all steps corresponding to S41 to S45 are represented by dashed lines in FIG. 4.

S46. The network device sends the DCI to the terminal device, and the terminal device receives the DCI.

In this embodiment of this application, based on different TB scheduling manners applied to the terminal device, the DCI sent by the network device to the terminal device may be interpreted in different interpretation manners. As described above, when the TB scheduling manner is scheduling one TB in one piece of DCI, the existing interpretation manner is still used; when the TB scheduling manner is scheduling two TBs in one piece of DCI, the new interpretation manner in this embodiment of this application may be used. In addition, to ensure reliability of the format of the DCI without changing a size of the DCI, the new interpretation manner in this embodiment of this application is provided based on an existing format of the DCI. For example, an existing field in the DCI is interpreted into a new meaning.

For the new DCI interpretation manner that is provided in this embodiment of this application and that is used when two TBs are scheduled in one piece of DCI, a first bit and a second bit in the DCI may be respectively used to indicate two NDIs associated with the two TBs scheduled in the DCI. In other words, the existing first bit and second bit in the DCI may be reinterpreted, and based on the meanings obtained after the reinterpretation, the first bit and the second bit may be respectively used to indicate the two NDIs associated with the two TBs scheduled in the DCI. The new interpretation manner is agreed by the network device and the terminal device in advance. To be specific, provided that the network device determines that the TB scheduling manner to be applied to the terminal device is scheduling two TBs in one piece of DCI, meanings represented by fields in the DCI may be directly generated in this new interpretation manner. Correspondingly, after receiving the DCI, the terminal device may interpret the DCI in a same interpretation manner as the network device, to implement reliable communication between the terminal device and the network device.

S47. The terminal device determines an uplink transmission manner and a downlink transmission manner based on the received DCI.

In addition to carrying the NDI, the DCI is further used to carry resource scheduling information configured by the network device. The resource scheduling information carried in the DCI may be used for uplink transmission or downlink transmission. Therefore, after obtaining the DCI sent by the network device, the terminal device may interpret the DCI in the pre-agreed interpretation manner, further determines a TB, a resource, and a corresponding NDI that correspond to the uplink or downlink transmission, and determines, based on the NDI, to perform new transmission or retransmission on the corresponding TB on the resource. For example, determining, based on the NDI, to perform new transmission or retransmission on the corresponding TB on an uplink resource may be understood as an uplink transmission manner, and determining, based on the NDI, to perform new transmission or retransmission on the corresponding TB on a downlink resource may be understood as a downlink transmission manner.

S48. The terminal device performs uplink data transmission or downlink data transmission based on the determined uplink transmission manner and downlink transmission manner.

To be specific, after determining the specific transmission manner based on the DCI, the terminal device may perform corresponding data transmission in the determined manner, for example, determine resources on which new transmission or retransmission of data is to be performed.

In this embodiment of this application, the two NDIs associated with the two TBs scheduled in one piece of DCI are carried in the DCI, so that DCI overheads are not increased as much as possible. In addition, the first bit and the second bit in the DCI are respectively used to indicate the NDIs associated with the two TBs. In other words, different NDIs are independently indicated by using different bit indication bits. Therefore, a TB that needs to be retransmitted can be accurately distinguished, thereby improving retransmission efficiency.

To facilitate understanding of the solutions in the embodiments of this application, the following uses an NB-IOT system as an example for description. First, channels and a format of DCI in the NB-IOT system are described.

In NB-IOT, three types of downlink physical channels: a narrowband physical downlink control channel (NPDCCH), a narrowband physical downlink shared channel (NPDSCH), and a narrowband physical broadcast channel (NPDBCH) are defined. The NPDCCH is mainly used to carry the DCI; to be specific, to perform uplink and downlink scheduling. The DCI includes uplink and downlink scheduling information (uplink and downlink resource assignment), a HARQ feedback, random access response (RAR) scheduling information, a page indicator, and the like. Transmission is performed on the NPDCCH aggregated by one or two narrowband channel control elements (NCCE).

The DCI in the NB-IoT system has three formats: format N0, format N1, and format N2. Format N0 is used for uplink scheduling, to be specific, used for narrowband physical uplink shared channel (NPUSCH) scheduling. Format N1 is used for downlink NPDSCH scheduling. Format N1 can be used for all NPDSCHs, including user data and system information blocks (SIBs), expect NPDSCHs carrying paging and to trigger a non-contention based random access. Format N1 includes RAR scheduling, HARQ ACK/NACK resources of the narrowband physical downlink shared channel (NPDSCH), and a quantity of NPDSCH retransmissions. Format N2 is mainly used for paging scheduling and direct indication of system update.

Because format N0 of the DCI is used for the uplink scheduling, and format N1 of the DCI is used for the downlink scheduling, after receiving the DCI sent by the network device, the terminal device may determine, based on the format of the DCI, a specific type of scheduling to be performed. For ease of understanding, refer to format N0 shown in Table 1 and format N1 shown in Table 2. Formats of the DCI shown in Table 1 and Table 2 are described by using a format that is of the DCI and that is specified in the standard Release 14 as an example. Certainly, there are other formats of the DCI before the standard Release 14. For example, a biggest difference between a format of the DCI before the standard Release 14 and the formats of the DCI shown in Table 1 and Table 2 lies in that the format of the DCI before the standard Release 14 does not have a HARQ process number field. To be specific, compared with the DCI in Table 1 and Table 2, the DCI before the standard Release 14 includes only 23 bits, and is lack of 1 bit occupied by a HARQ processes number field.

TABLE 1

| DCI content | Number of bits |
| --- | --- |
| Flag for format N0/format N1 differentiation | 1 |
| Subcarrier indication | 6 |
| Resource assignment | 3 |
| Scheduling delay | 2 |
| MCS | 4 |
| RV | 1 |
| Repetition number | 3 |
| NDI | 1 |
| DCI repetition number | 2 |
| HARQ process number | 1 |
| Total | 24 |

TABLE 2

| DCI content | Number of bits |
| --- | --- |
| Flag for format N0/format N1 differentiation | 1 |
| NPDCCH order indicator | 1 |
| Scheduling delay | 3 |
| Resource assignment | 3 |
| MCS | 4 |
| Repetition number | 4 |
| NDI | 1 |

TABLE 2-continued

| DCI content | Number of bits |
| --- | --- |
| HARQ-ACK resource | 4 |
| DCI repetition number | 2 |
| HARQ process number | 1 |
| Total | 24 |

Each field in the DCI is used to indicate scheduling information of a HARQ process used by a currently invoked TB.

A format of the DCI for the uplink scheduling in NB-IoT is format N0. Referring to Table 1, a HARQ process identifier is indicated by using the HARQ process number field. The scheduling delay field is used as an example. For a HARQ process 0, the scheduling delay field indicates a delay between DCI of the HARQ process 0 and uplink data of the HARQ process 0. For a HARQ process 1, the scheduling delay field indicates a delay between DCI of the HARQ process 1 and uplink data of the HARQ process 1. The NDI is used to indicate whether current transmission is initial transmission or retransmission. An uplink HARQ feedback does not have an independent channel, and may be indicated by using the NDI. The redundancy version (RV) is designed to implement incremental redundancy (IR) HARQ transmission. To be specific, redundant bits generated by an encoder are divided into several groups, each RV defines one transmission start point, and different RVs are separately used for initial transmission and each HARQ retransmission. In this way, redundant bits are gradually accumulated, and an incremental redundancy HARQ operation is completed, thereby improving reliability of retransmission.

A format of the DCI for the downlink scheduling in NB-IoT is format N1. Referring to Table 2, a HARQ process identifier is indicated by using the HARQ process number field. The scheduling delay field is used as an example. For a HARQ process 0, the scheduling delay field indicates a delay between DCI of the HARQ process 0 and downlink data of the HARQ process 0. For the HARQ process 1, the scheduling delay field indicates a delay between DCI of the HARQ process 1 and downlink data of the HARQ process 1. The NDI is used to indicate whether current transmission is initial transmission or retransmission. In other words, a downlink HARQ feedback is indicated by using the NDI.

In addition, some fields in Table 1 and Table 2 are further described. The flag for format N0/format N1 differentiation field is used to indicate a specific format of the DCI. To be specific, the terminal device identifies, by using the field, whether the format of the DCI is format N0 or format N1, so as to determine whether the uplink scheduling or the downlink scheduling is performed. In another description, the flag for format N0/format N1 differentiation field is also referred to as a DCI format flag field. The subcarrier indication field is used to indicate a frequency domain resource location, and is specifically used to indicate a subcarrier location, or a subcarrier location and a quantity of subcarriers. The resource assignment field is used to indicate scheduling resource assignment, for example, time domain resource assignment. The modulation and coding scheme (modulation and coding scheme, MCS) field is used to indicate a modulation order. A transport block size may be determined based on the MCS field and the resource assignment field. The repetition number field is used to indicate a repetition number used for TB transmission. The DCI repetition number field is used to indicate a DCI repetition number. The HARQ-ACK resource field is used to indicate a resource location at which a HARQ feedback is transmitted.

The following further describes, with reference to format N0 and format N1 shown in Table 1 and Table 2 described above, the new DCI interpretation manner provided in this embodiment of this application. In addition, this embodiment of this application provides the following several different interpretation manners.

Manner 1

The first bit and the second bit in the DCI are directly and respectively used to indicate the two NDIs associated with the two TBs scheduled in the DCI.

In Manner 1, one piece of DCI carries the two NDIs associated with the two TBs scheduled in the DCI, to reduce the DCI overheads as much as possible. In addition, the first bit and the second bit in the DCI are respectively used to indicate the NDIs associated with the two TBs. In other words, different NDIs are independently indicated by using different bit indication bits. Therefore, a TB that needs to be retransmitted can be accurately distinguished, retransmission identification accuracy can be improved, and retransmission efficiency can be further improved.

In a possible implementation, the first bit and the second bit may be bits respectively occupied by two fields in the DCI. In other words, the first bit and the second bit belong to different fields in the DCI, and two HARQ feedbacks are directly indicated by using the different fields. Because there is a clear interval between the different fields, identifiability of the first bit and the second bit can be improved to some extent, so as to accurately identify and interpret the first bit and the second bit.

Further, when the first bit and the second bit belong to two different fields, optionally, the existing NDI field in the DCI may be directly used as one of the two fields. In other words, one bit in the NDI field may be directly interpreted as the first bit or the second bit, or the existing NDI field in the DCI is directly used to indicate one of the NDIs associated with the two TBs because the NDI originally occupies only 1 bit. Referring to Table 1 or Table 2, it can be learned that because the existing DCI originally includes the NDI field, the NDI field is directly reused, so that redefinition of the DCI can be reduced as much as possible. In this way, a burden of rewriting interpretation can be reduced as much as possible, and an accurate indication of the NDIs associated with the two TBs can also be ensured.

After determining that one of the fields is the existing NDI field in the DCI, the network device further needs to redefine the other field, so that the terminal device interprets the other field based on redefinition. Based on a feature of the format of the DCI, the flag for format N0/format N1 differentiation field (the DCI format flag field) is used to indicate a format of the DCI, and cannot be occupied. On this basis, the other field may be defined as a field other than the NDI field and the DCI format flag field, for example, defined as the HARQ process number field or the RV field, or may be defined as the subcarrier indication field, the repetition number field, the HARQ-ACK resource field, and the like. It should be noted that, when the other field is defined, the format of the DCI needs to be considered. For example, when the format of the DCI is format N0, the other field may be defined as the RV field, the HARQ process number field, or the subcarrier indication field. For another example, when the format of the DCI is format N1, the other field may be defined as the repetition number field, the HARQ process number field, or the HARQ-ACK resource field.

When the other field is defined, a quantity of bits occupied by each field may be first determined, and a field that occupies a relatively large quantity of bits is selected as much as possible. Because the field occupies the relatively large quantity of bits, if one bit in the field is reinterpreted as an NDI associated with one of the TBs, a quantity of remaining bits is still relatively large, so that expression of information originally indicated by the field may not be affected as much as possible. In this way, impact on the information originally indicated by the DCI may be reduced as much as possible while retransmission efficiency is improved. An example in which the other field occupies a repetition number field of four bits is used. One bit in the field may be selected to represent the foregoing first bit or second bit, and the bit may be selected from any location in the original four bits for reinterpretation. For example, one bit of a most significant bit is selected, one bit of a least significant bit is selected, or one bit of a second most significant bit may be selected. As long as one bit is selected as the first bit or the second bit that needs to be interpreted in the new interpretation manner, the repetition number field actually includes only three remaining bits. In this way, when information indicated by the repetition number field is interpreted, the three remaining bits are used for indication.

In this embodiment of this application, an existing field in the DCI is reinterpreted as an NDI field without increasing the DCI overheads, thereby ensuring DCI transmission reliability. In addition, different NDIs are independently indicated by using different bit indication bits. Therefore, a TB that needs to be retransmitted can be accurately distinguished, retransmission identification accuracy can be improved, and retransmission efficiency can be further improved.

Table 3 schematically shows a new interpretation manner that is of the DCI and that is used when the other field is defined as the HARQ process number field. That is, a bit occupied by the HARQ process number field is directly interpreted as an NDI indication. In this case, a format of the DCI does not change, but an interpretation manner changes. A strikethrough on the HARQ process number in Table 3 merely shows that the occupied bit is interpreted as an NDI.

TABLE 3

| DCI content | Number of bits |
|---|---|
| Flag for format N0/format N1 differentiation | 1 |
| Subcarrier indication | 6 |
| Resource assignment | 3 |
| Scheduling delay | 2 |
| MCS | 4 |
| RV | 1 |
| Repetition number | 3 |
| NDI | 1 |
| DCI repetition number | 2 |
| HARQ process number NDI | 1 |
| Total | 24 |

Table 4 schematically shows a new interpretation manner that is of the DCI and that is used when the other field is defined as the HARQ process number field. That is, the HARQ process number field is directly replaced with an NDI field. That is, the DCI includes two NDI fields. In this case, it is equivalent to that a format of the DCI is changed, but the change is an interpretation change made without changing an overall structure and a length of the DCI. This does not affect DCI reliability. In addition, a new interpretation manner is provided, thereby increasing DCI interpretation flexibility. For example, a changed format of the DCI is referred to as format N3 or another format.

TABLE 4

| DCI content | Number of bits |
| --- | --- |
| Flag for format N0/format N1 differentiation | 1 |
| Subcarrier indication | 6 |
| Resource assignment | 3 |
| Scheduling delay | 2 |
| MCS | 4 |
| RV | 1 |
| Repetition number | 3 |
| NDI | 1 |
| DCI repetition number | 2 |
| NDI | 1 |
| Total | 24 |

In another possible implementation, the first bit and the second bit may alternatively belong to a same field. For example, the first bit and the second bit are two different bits in the repetition number field. In other words, the two NDIs associated with the two TBs may also be carried in the same field, to implement solution diversity. This facilitates flexible setting of the first bit and the second bit. In this manner, an unused NDI field may be reserved as a reserved bit for other use, for example, may be used for some extension. It is equivalent to adding an extensible use field of the DCI, thereby improving DCI scheduling flexibility.

Manner 2

Although the two TBs may be scheduled in one piece of DCI, actually, for one piece of specific DCI, a quantity of TBs actually scheduled in the DCI may be one or two. In addition, as described above, the TBs scheduled in the DCI may use a same HARQ process, or may each use one HARQ process. When the two TBs each use one HARQ process, the two TBs scheduled in the DCI use two HARQ processes in total. That is, when the two TBs are scheduled in one piece of DCI, one or two HARQ processes may be actually used.

Based on the foregoing analysis, for Manner 2, the following further describes two specific implementations.

Manner A: A third bit is defined in the DCI. The third bit is used to indicate that the quantity of TBs scheduled in the DCI is 1 or 2. In other words, the third bit is used to indicate the quantity of TBs actually scheduled in the DCI.

In addition, the first bit and/or the second bit are/is further defined in the DCI. When the quantity of TBs scheduled in the DCI is 1, the first bit or the second bit is used to indicate one NDI associated with one TB scheduled in the DCI. When the quantity of TBs scheduled in the DCI is 2, the first bit and the second bit are respectively used to indicate two NDIs associated with two TBs scheduled in the DCI.

Manner B: A third bit is further defined in the DCI. The third bit is used to indicate that the quantity of HARQ processes used by the TB(s) scheduled in the DCI is 1 or 2. In other words, the third bit is used to indicate the quantity of HARQ processes actually used by the TB(s) scheduled in the DCI.

In addition, the first bit and/or the second bit are/is further defined in the DCI. When the quantity of HARQ processes used by the TB(s) scheduled in the DCI is 1, the first bit or the second bit is used to indicate one NDI associated with one TB scheduled in the DCI. When the quantity of HARQ processes used by the TB(s) scheduled in the DCI is 2, the first bit and the second bit are respectively used to indicate two NDIs associated with two TBs scheduled in the DCI.

It should be noted that, when the quantity of TBs scheduled in the DCI is 1 or the quantity of HARQ processes used by the TB(s) scheduled in the DCI is 1, one of the first bit and the second bit may be selected; in other words, there is only the first bit or the second bit. Therefore, it may be understood as follows: When the quantity of TBs scheduled in the DCI is 1 or the quantity of HARQ processes used by the TB(s) scheduled in the DCI is 1, the first bit is the same as the second bit.

In Manner 2, the quantity of TBs actually scheduled in the DCI or the quantity of HARQ processes actually used by the TB(s) scheduled in the DCI can be determined by defining the third bit, so that the terminal device can determine an actual scheduling status of the network device based on the DCI, thereby improving reliability of communication between the terminal device and the network device.

For the foregoing manner A or manner B, when the format of the DCI is format N0, the third bit may be a bit occupied by the HARQ process number field, the subcarrier indication field, or the repetition number field in the DCI. When the format of the DCI is format N1, the third bit may be a bit occupied by the HARQ process number field, the repetition number field, or the HARQ-ACK resource field in the DCI. For a reason for setting the third bit as a bit in these fields, refer to the reason for selecting and defining of the first bit and the second bit in the foregoing Manner 1. Details are not described herein again. That is, the third bit is defined in this embodiment of this application, so that the third bit can be reinterpreted based on the definition. However, it should be understood that, because the third bit is dedicated to indicating the quantity of TBs actually scheduled in the DCI or the quantity of HARQ processes actually used by the TB(s) scheduled in the DCI, it is better not to reuse the third bit and the first bit, and the third bit and the second bit, so as to avoid an interpretation error. In other words, the third bit and the first bit are different bits, and the third bit and the second bit are also different bits. The third bit is defined differently for different formats of the DCI, so that the third bit can be used in a plurality of scenarios, thereby increasing flexibility of defining the third bit.

For Manner A or Manner B, when the quantity of TBs scheduled in the DCI is 1 or the quantity of HARQ processes used by the TB(s) scheduled in the DCI is 1, a field in which the first bit or the second bit is located is an NDI field in the DCI. For a reason for defining the NDI field, refer to the reason for selecting the NDI field in the Manner 1. Repeated descriptions are not provided herein again. In addition, as described in Manner 1, the first bit or the second bit may alternatively be a bit in another field, provided that the first bit (or the second bit) and the third bit are different bits.

In this embodiment of this application, when the quantity of TBs scheduled in the DCI is 1 and the field in which the first bit or the second bit is located is the NDI field in the DCI, a transmission resource location of the TB scheduled in the DCI may be considered as a predetermined transmission resource location by default; in other words, the terminal device determines the transmission resource location of the TB in a default manner. Alternatively, in another possible implementation, a fourth bit may be further defined in the DCI. The fourth bit is used to indicate a transmission resource location of one TB scheduled in the DCI. Compared with the foregoing default manner, in this manner, the fourth bit is used to indicate the transmission resource location of the scheduled TB, so that an actual transmission resource location of the currently scheduled TB can be determined, to avoid blind detection, thereby improving communication efficiency and reliability.

In this embodiment of this application, when the quantity of HARQ processes used by the TB(s) scheduled in the DCI is 1 and the field in which the first bit or the second bit is located is the NDI field in the DCI, the HARQ process used by the TB scheduled in the DCI may be considered as a predetermined HARQ process by default; in other words, the terminal device determines, in a default manner, a HARQ process used by the currently scheduled TB. Alternatively, in another possible implementation, a fourth bit may be further defined in the DCI. The fourth bit is used to indicate a HARQ process identifier of a HARQ process actually used by the TB scheduled in the DCI. In other words, the fourth bit is used to clearly indicate a specific HARQ process used by the currently scheduled TB. The fourth bit is used to indicate the HARQ process identifier of the HARQ process used by the scheduled TB, so that blind detection can be avoided, and communication efficiency and reliability can be improved. When the quantity of actually used HARQ processes is 1, for example, it is agreed that the HARQ process is a process 0, in the following scenario, when the terminal device needs to retransmit data only in a HARQ process 1, if the terminal device switches to the process 0 to perform new transmission, data newly transmitted in the process 0 cannot be combined with information in a HARQ buffer (buffer) of the HARQ process 1; if the terminal device still uses the process 1 to perform retransmission, it means that in this scenario, the network device needs to schedule and use two processes even if there is no data in the process 0. From a perspective of a network side, network resources are wasted. From a perspective of the terminal device, there is no data in the process 0 but the network device schedules the process 0 to transmit the data, thereby increasing power consumption of the terminal device. Therefore, in this embodiment of this application, the fourth bit is used to indicate the HARQ process identifier, so that network resources can be reduced, and the power consumption of the terminal device can be reduced.

In a possible implementation, the fourth bit may be a bit occupied by a field other than the NDI field, the HARQ process number field, and the DCI format flag field in the DCI. The fourth bit is different from the third bit, and the fourth bit is also different from the first bit (or the second bit).

In a possible implementation, when the format of the DCI is format N0, the fourth bit may be a bit occupied by the RV field or the repetition number field; or when the format of the DCI is format N1, the fourth bit may be a bit occupied by the repetition number field or the HARQ-ACK resource field. In another possible implementation, the DCI may further include the HARQ process identifier field, and the fourth bit may be a bit occupied by the HARQ process identifier field. In other words, the fourth bit is carried in a newly defined HARQ process identifier field, so that the fourth bit is more identifiable.

In this embodiment of this application, when the quantity of TBs scheduled in the DCI is 2 or the quantity of HARQ processes used by the TB(s) scheduled in the DCI is 2, the first bit and the second bit may be bits respectively occupied by two fields in the DCI. For example, one of the fields is the NDI field, and the other field is a field other than the NDI field and the DCI format flag field. Further, when the format of the DCI is format N0, the other field may be the RV field or the repetition number field; or when the format of the DCI is format N1, the other field may be the repetition number field or the HARQ-ACK resource field.

For definitions of fields that can carry the first bit and the second bit, refer to related descriptions of the first bit and the second bit in Manner 1. Details are not described herein again.

In another possible implementation, the first bit and the second bit may alternatively belong to a same field. For example, the first bit and the second bit are two different bits in the repetition number field. In other words, the two NDIs associated with the two TBs may also be carried in the same field, to implement solution diversity. This facilitates flexible setting of the first bit and the second bit. In this manner, an unused NDI field may be reserved as a reserved bit for other use, for example, may be used for some extension. It is equivalent to adding an extensible use field of the DCI, thereby improving DCI scheduling flexibility.

In this embodiment of this application, the quantity of HARQ processes actually used by the TB(s) scheduled in the DCI or the quantity of TBs scheduled in the DCI can be determined by defining the third bit, so that the terminal device can determine the actual scheduling status of the network device based on the DCI, thereby improving the reliability of communication between the terminal device and the network device. In addition, the NDI associated with the TB scheduled in one piece of DCI is carried in the DCI, so that the DCI overheads are not increased as much as possible. In addition, the first bit and/or the second bit in the DCI are respectively used to indicate the NDIs associated with the two TBs. In other words, different NDIs are independently indicated by using different bit indication bits. Therefore, a TB that needs to be retransmitted can be accurately distinguished, thereby improving retransmission efficiency.

In the foregoing embodiments provided in this application, the method provided in the embodiments of this application is separately described from perspectives of the network device, the terminal device, and interaction between the network device and the terminal device. To implement functions in the foregoing method provided in the embodiments of this application, the network device and the terminal device may include a hardware structure and/or a software module, and implement the foregoing functions in a form of the hardware structure, the software module, or a combination of the hardware structure and the software module. Whether a specific function in the foregoing functions is performed by the hardware structure, the software module, or the combination of the hardware structure and the software module depends on a specific application and a design constraint of the technical solutions.

Figure 5:
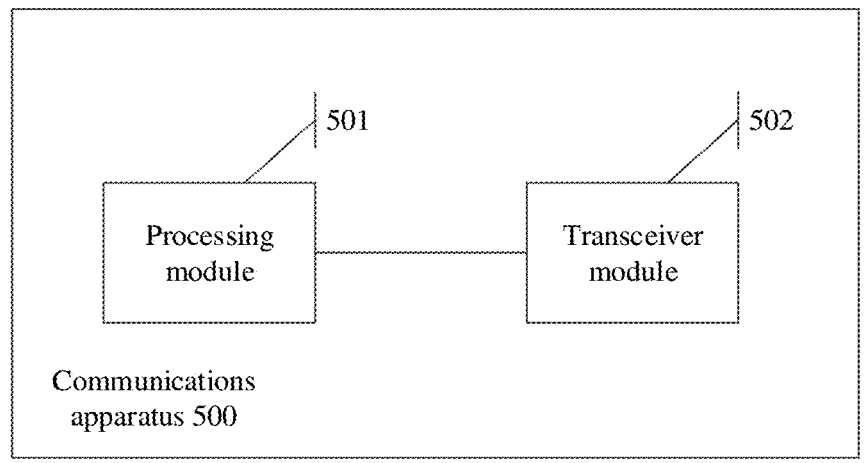
FIG. 5 is a structural block diagram of a communications apparatus according to an embodiment of this application.

Based on a same inventive concept, as shown in FIG. 5, an embodiment of this application provides a communications apparatus 500. The communications apparatus 500 may be a terminal device, and can implement functions of the terminal device in the data transmission method provided in the embodiments of this application. Alternatively, the apparatus 500 may be an apparatus that can support a terminal device in implementing functions of the terminal device in the data transmission method provided in the embodiments of this application. The apparatus 500 may be a hardware structure, a software module, or a combination of a hardware structure and a software module. The apparatus 500 may be implemented by a chip system. In this embodiment of this application, the chip system may include a chip, or may include a chip and another discrete component. As shown in FIG. 5, the apparatus 500 may include a processing module 501 and a transceiver module 502.

The processing module 501 may be configured to perform S41 and S47 in the embodiment shown in FIG. 4, and/or configured to support another process of the technology described in this specification. The transceiver module 502 may be configured to perform S45 and S46 in the embodiment shown in FIG. 4, and/or configured to support another process of the technology described in this specification. The transceiver module 502 is used by the apparatus 500 to communicate with another module, and may be a circuit, a component, an interface, a bus, a software module, a transceiver, or any other apparatus that can implement communication.

All related content of the steps in the foregoing method embodiments may be cited in function descriptions of corresponding functional modules. Details are not described herein again.

Figure 6:
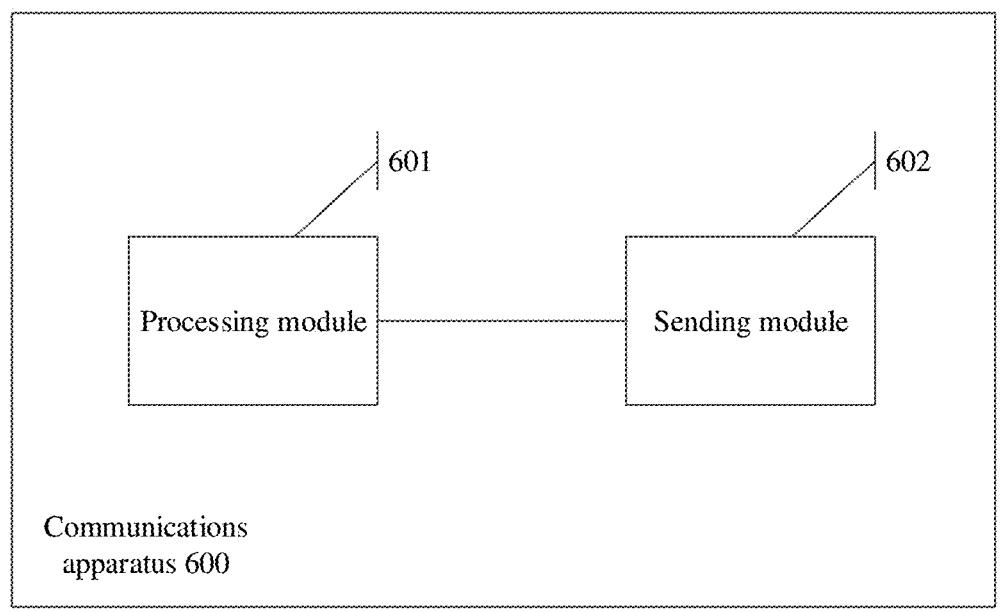
FIG. 6 is another structural block diagram of a communications apparatus according to an embodiment of this application.

Based on a same inventive concept, as shown in FIG. 6, an embodiment of this application provides a communications apparatus 600. The communications apparatus 600 may be a network device, and can implement functions of the network device in the data transmission method provided in the embodiments of this application. Alternatively, the apparatus 600 may be an apparatus that can support a network device in implementing functions of the network device in the data transmission method provided in the embodiments of this application. The apparatus 600 may be a hardware structure, a software module, or a combination of a hardware structure and a software module. The apparatus 600 may be implemented by a chip system. In this embodiment of this application, the chip system may include a chip, or may include a chip and another discrete component. As shown in FIG. 6, the apparatus 600 may include a processing module 601 and a sending module 602.

The processing module 601 may be configured to perform S41 and S47 in the embodiment shown in FIG. 4, and/or configured to support another process of the technology described in this specification. The sending module 602 may be configured to perform S45 and S46 in the embodiment shown in FIG. 4, and/or configured to support another process of the technology described in this specification. The sending module 602 is used by the apparatus 600 to communicate with another module, and may be a circuit, a component, an interface, a bus, a software module, a transceiver, or any other apparatus that can implement communication. In addition, the apparatus 600 may further include a receiving module, and the receiving module may be configured to perform S42 and S48 in the embodiment shown in FIG. 4, and/or configured to support another process of the technology described in this specification.

All related content of the steps in the foregoing method embodiments may be cited in function descriptions of corresponding functional modules. Details are not described herein again.

Figure 7:
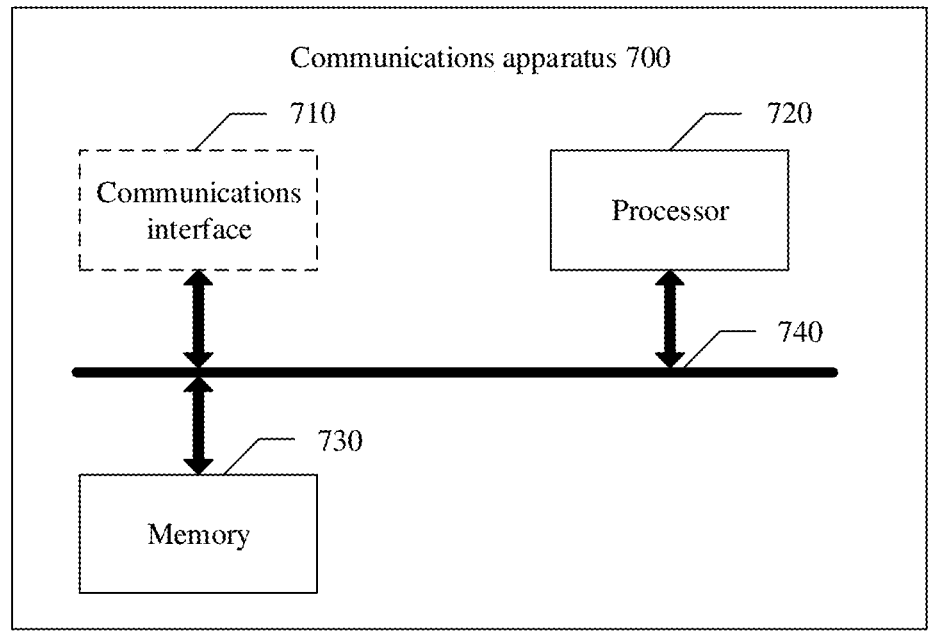
FIG. 7 is a schematic structural diagram of a communications apparatus according to an embodiment of this application.

Based on a same concept, as shown in FIG. 7, an embodiment of this application provides a communications apparatus 700. FIG. 7 is a schematic structural diagram of the communications apparatus 700 according to an embodiment of this application. The communications apparatus 700 may be a terminal device, and can implement functions of the terminal device in the data transmission method provided in the embodiments of this application. Alternatively, the communications apparatus 700 may be an apparatus that can support a terminal device in implementing functions of the terminal device in the data transmission method provided in the embodiments of this application. The communications apparatus 700 may be a chip system. In this embodiment of this application, the chip system may include a chip, or may include a chip and another discrete component.

The communications apparatus 700 includes at least one processor 720, configured to implement or support the apparatus in implementing the functions of the terminal device in the data transmission method provided in the embodiments of this application. For example, the processor 720 may process information, for example, may correspond to the processing module 501 in the apparatus 500 shown in FIG. 5.

The communications apparatus 700 may further include at least one memory 730, configured to store a program instruction and/or data. The memory 730 is coupled to the processor 720. In this embodiment of this application, the coupling is an indirect coupling or a communication connection between apparatuses, units, or modules, may be in an electrical form, a mechanical form, or another form, and is used for information exchange between the apparatuses, the units, or the modules. The processor 720 may operate in collaboration with the memory 730. The processor 720 may execute the program instruction stored in the memory 730. At least one of the at least one memory may be included in the processor.

The communications apparatus 700 may further include a communications interface 710, configured to communicate with another device through a transmission medium, so that an apparatus used in the communications apparatus 700 can communicate with the another device. The processor 720 may send and receive data by using the communications interface 710. For example, the communications interface 710 may correspond to the transceiver module 502 in FIG. 5.

In this embodiment of this application, a specific connection medium between the communications interface 710, the processor 720, and the memory 730 is not limited. In this embodiment of this application, the memory 730, the processor 720, and the communications interface 710 are connected through a bus 740 in FIG. 7, and the bus is represented by a thick line in FIG. 7. A connection manner between other components is schematically described, and is not limited herein. The bus may be classified into an address bus, a data bus, a control bus, and the like. For ease of representation, only one thick line is used to represent the bus in FIG. 7, but this does not mean that there is only one bus or only one type of bus.

In this embodiment of this application, the processor 720 may be a general-purpose processor, a digital signal processor, an application-specific integrated circuit, a field programmable gate array or another programmable logic device, a discrete gate or transistor logic device, or a discrete hardware component, and may implement or execute the method, steps, and logical block diagrams disclosed in the embodiments of this application. The general-purpose processor may be a microprocessor, any conventional processor, or the like. The steps of the method disclosed with reference to the embodiments of this application may be directly performed and completed by using a hardware processor, or may be performed and completed by using a combination of hardware and software modules in the processor.

In this embodiment of this application, the memory 730 may be a nonvolatile memory, for example, a hard disk drive (HDD) or a solid-state drive (SSD); or may be a volatile memory, for example, a random access memory (RAM). The memory is any other medium that can be used to carry or store expected program code in a form of an instruction or a data structure and that can be accessed by a computer. However, this is not limited thereto. The memory in this embodiment of this application may alternatively be a circuit or any other apparatus that can implement a storage function, and is configured to store the program instruction and/or the data.

Figure 8:
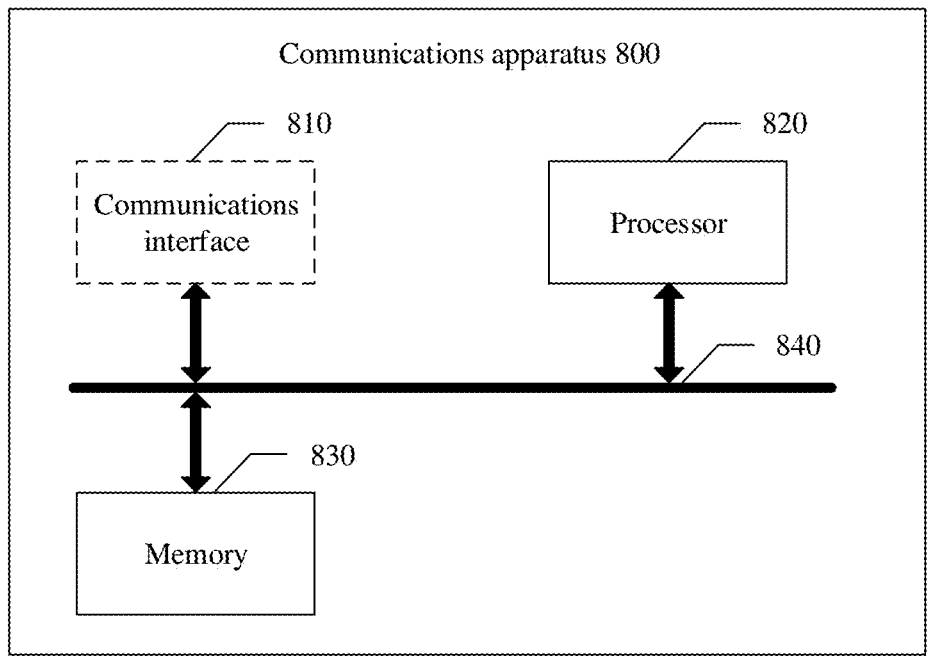
FIG. 8 is another schematic structural diagram of a communications apparatus according to an embodiment of this application.

Based on a same concept, as shown in FIG. 8, an embodiment of this application provides another communications apparatus 800. FIG. 8 is a schematic structural diagram of another apparatus 800 according to an embodiment of this application. The communications apparatus 800 may be a network device, and can implement functions of the network device in the data transmission method provided in the embodiments of this application. Alternatively, the communications apparatus 800 may be an apparatus that can support a network device in implementing functions of the network device in the data transmission method provided in the embodiments of this application. The communications apparatus 800 may be a chip system. In this embodiment of this application, the chip system may include a chip, or may include a chip and another discrete component.

The communications apparatus 800 includes at least one processor 820, configured to implement or support the apparatus in implementing the functions of the network device in the data transmission method provided in the embodiments of this application. For example, the processor 820 corresponds to the processing module 601 in the embodiment shown in FIG. 6.

The communications apparatus 800 may further include at least one memory 830, configured to store a program instruction and/or data. The memory 830 is coupled to the processor 820. In this embodiment of this application, the coupling is an indirect coupling or a communication connection between apparatuses, units, or modules, may be in an electrical form, a mechanical form, or another form, and is used for information exchange between the apparatuses, the units, or the modules. The processor 820 may operate in collaboration with the memory 830. The processor 820 may execute the program instruction stored in the memory 830. At least one of the at least one memory may be included in the processor.

The communications apparatus 800 may further include a communications interface 810, configured to communicate with another device through a transmission medium, so that an apparatus used in the communications apparatus 800 can communicate with the another device. The processor 820 may send and receive data by using the communications interface 810. For example, the communications interface 810 may correspond to the sending module 602 in FIG. 6.

In this embodiment of this application, a specific connection medium between the communications interface 810, the processor 820, and the memory 830 is not limited. In this embodiment of this application, the memory 830, the processor 820, and the communications interface 810 are connected through a bus 840 in FIG. 8, and the bus is represented by a thick line in FIG. 8. A connection manner between other components is schematically described, and is not limited herein. The bus may be classified into an address bus, a data bus, a control bus, and the like. For ease of representation, only one thick line is used to represent the bus in FIG. 8, but this does not mean that there is only one bus or only one type of bus.

In this embodiment of this application, the processor 820 may be a general-purpose processor, a digital signal processor, an application-specific integrated circuit, a field programmable gate array or another programmable logic device, a discrete gate or transistor logic device, or a discrete hardware component, and may implement or execute the method, steps, and logical block diagrams disclosed in the embodiments of this application. The general-purpose processor may be a microprocessor, any conventional processor, or the like. The steps of the method disclosed with reference to the embodiments of this application may be directly performed and completed by using a hardware processor, or may be performed and completed by using a combination of hardware and software modules in the processor.

In this embodiment of this application, the memory 830 may be a nonvolatile memory, for example, an HDD or a solid-state drive SSD; or may be a volatile memory (volatile memory), for example, a random access memory RAM. The memory is any other medium that can be used to carry or store expected program code in a form of an instruction or a data structure and that can be accessed by a computer. However, this is not limited thereto. The memory in this embodiment of this application may alternatively be a circuit or any other apparatus that can implement a storage function, and is configured to store the program instruction and/or the data.

An embodiment of this application further provides a computer-readable storage medium, including an instruction. When the instruction is run on a computer, the computer is enabled to perform the data transmission method in the embodiments of this application.

An embodiment of this application provides a chip system. The chip system includes a processor, and may further include a memory, to implement the data transmission method in the embodiments of this application. The chip system may include a chip, or may include a chip and another discrete component.

An embodiment of this application further provides a computer program product including an instruction. The computer program product stores the instruction, and when the computer program product runs on a computer, the computer is enabled to perform the foregoing data transmission method.

All or some of the foregoing embodiments may be implemented by using software, hardware, or any combination thereof. When being implemented by using a software program, all or some of the embodiments may be implemented in a form of a computer program product. The computer program product includes one or more instructions. When a computer program instruction is loaded and executed on a computer, the procedures or functions according to the embodiments of this application are completely or partially generated. The computer may be a general-purpose computer, a dedicated computer, a computer network, or another programmable device. The instruction may be stored in a computer storage medium or may be transmitted from a computer storage medium to another computer storage medium. For example, the instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible to the computer, or a data storage device, such as a server or a data center, integrating one or more usable media. The usable medium may be a magnetic medium (for example, a floppy disk, a hard disk, a tape, or a magnetic optical disk (MO)), an optical medium (for example, a CD, a DVD, a BD, or an HVD), a semiconductor medium (for example, a ROM, an EPROM, an EEPROM, a nonvolatile memory (NAND FLASH), or a solid-state drive (Solid State Disk, SSD)), or the like.

The embodiments of this application are described with reference to the flowcharts and/or block diagrams of the method, the device (system), and the computer program product according to the embodiments of this application. It should be understood that instructions may be used to implement each procedure and/or each block in the flowcharts and/or the block diagrams and a combination of a procedure and/or a block in the flowcharts and/or the block diagrams. These instructions may be provided for a processor of a general-purpose computer, a dedicated computer, an embedded processor, or another programmable data processing device to generate a machine, so that the instructions executed by the processor of the computer or the another programmable data processing device generate a device for implementing a specific function in one or more procedures in the flowcharts and/or in one or more blocks in the block diagrams.

These instructions may alternatively be stored in a computer-readable memory that can indicate the computer or the another programmable data processing device to work in a specific manner, so that the instructions stored in the computer-readable memory generate an artifact that includes an instruction device. The instruction device implements a specific function in one or more procedures in the flowcharts and/or in one or more blocks in the block diagrams.

These instructions may be loaded into the computer or another programmable data processing device, so that a series of operations and steps are performed on the computer or the another programmable device, to generate computer-implemented processing. Therefore, the instructions executed on the computer or another programmable device provide steps for implementing a specified function in one or more procedures in the flowcharts and/or in one or more blocks in the block diagrams.

It is clear that a person skilled in the art can make various modifications and variations to the embodiments of this application without departing from the scope of this application. This application is intended to cover these modifications and variations to the embodiments of this application provided that they fall within the scope of protection defined by the following claims and their equivalent technologies.

What is claimed is:

1. A method, comprising:
  receiving downlink control information (DCI) from a network device, wherein two transport blocks (TBs) or one TB are schedulable in the DCI, the DCI comprises a third bit, the third bit indicates that a quantity of the TB(s) scheduled in the DCI is 1 or 2, and the DCI further comprises a first bit or a second bit; and
  when the quantity of the TB(s) scheduled in the DCI is 1, performing, based on the third bit, and based on the first bit or the second bit, uplink data transmission or downlink data transmission in a hybrid automatic repeat request (HARQ) process corresponding to the TB scheduled in the DCI, wherein the first bit or the second bit indicates a new data indicator (NDI) associated with the TB scheduled in the DCI; or
  when the quantity of the TB(s) scheduled in the DCI is 2, performing, based on the third bit, the first bit, and the second bit, uplink data transmission or downlink data transmission in HARQ processes corresponding to the TBs scheduled in the DCI, wherein the first bit and the second bit indicate two NDIs associated with the two TBs scheduled in the DCI.

2. The method according to claim 1, wherein when the quantity of the TB(s) scheduled in the DCI is 2, the first bit and the second bit are occupied by two fields in the DCI.

3. The method according to claim 2, wherein a first field of the two fields is an NDI field, and a second field of the two fields is a field other than the NDI field and a DCI format flag field.

4. The method according to claim 3, wherein the second field is a HARQ process number field.

5. The method according to claim 1, wherein a format of the DCI is format No or format N1.

6. An apparatus, comprising:
  a transceiver, configured to receive downlink control information (DCI) from a network device, wherein two transport blocks (TBs) or one TB are schedulable in the DCI, the DCI comprises a third bit, the third bit indicates that a quantity of HARQ processes used by the TB(s) scheduled in the DCI is 1 or 2, and the DCI further comprises a first bit or a second bit; and
  a processor, configured to:
    when the quantity of the TB(s) scheduled in the DCI is 1, perform, using the transceiver based on the third bit, and based on the first bit or the second bit, uplink data transmission or downlink data transmission in a hybrid automatic repeat request (HARQ) process corresponding to the TB scheduled in the DCI, wherein the first bit or the second bit indicates a new data indicator (NDI) associated with the TB scheduled in the DCI; or
    when the quantity of the TB(s) scheduled in the DCI is 2, perform, using the transceiver based on the third bit, the first bit, and the second bit, uplink data transmission or downlink data transmission in HARQ processes corresponding to the TBs scheduled in the DCI, wherein the first bit and the second bit indicate two NDIs associated with the two TBs scheduled in the DCI.

7. The apparatus according to claim 6, wherein when the quantity of the TB(s) scheduled in the DCI is 2, the first bit and the second bit are occupied by two fields in the DCI.

8. The apparatus according to claim 7, wherein a first field of the two fields is an NDI field, and a second field of the two fields is a field other than the NDI field and a DCI format flag field.

9. The apparatus according to claim 8, wherein the second field is a HARQ process number field.

10. The apparatus according to claim 6, wherein a format of the DCI is format No or format N1.

11. A method, comprising:
  determining downlink control information (DCI) to be sent to a terminal device, wherein two transport blocks (TBs) or one TB are schedulable in the DCI, the DCI comprises a third bit, the third bit indicates that a quantity of the TB(s) scheduled in the DCI is 1 or 2, and the DCI further comprises a first bit or a second bit, and wherein:
    when the quantity of the TB(s) scheduled in the DCI is 1, the first bit or the second bit indicates a new data indicator (NDI) associated with the TB scheduled in the DCI; or
    when the quantity of the TB(s) scheduled in the DCI is 2, the first bit and the second bit indicate two NDIs associated with the two TBs scheduled in the DCI; and
  sending the DCI to the terminal device.

12. The method according to claim 11, wherein when the quantity of the TB(s) scheduled in the DCI is 2, the first bit and the second bit are occupied by two fields in the DCI.

13. The method according to claim 12, wherein a first field of the two fields is an NDI field, and a second filed of the two fields is a field other than the NDI field and a DCI format flag field.

14. The method according to claim 13, wherein the second field is a HARQ process number field.

15. The method according to claim 11, wherein a format of the DCI is format No or format N1.

16. An apparatus, comprising:
a processor, configured to determine downlink control information (DCI) to be sent to a terminal device, wherein two transport blocks (TBs) or one TB are schedulable in the DCI, the DCI comprises a third bit, the third bit indicates that a quantity of the TB(s) scheduled in the DCI is 1 or 2, and the DCI further comprises a first bit or a second bit, and wherein:
when the quantity of the TB(s) scheduled in the DCI is 1, the first bit or the second bit indicates a new data indicator (NDI) associated with the TB scheduled in the DCI; or
when the quantity of the TB(s) scheduled in the DCI is 2, the first bit and the second bit indicate two NDIs associated with the two TBs scheduled in the DCI; and
a transmitter, configured to send the DCI to the terminal device.

17. The apparatus according to claim 16, wherein when the quantity of the TB(s) scheduled in the DCI is 2, the first bit and the second bit are occupied by two fields in the DCI.

18. The apparatus according to claim 17, wherein a first field of the two fields is an NDI field, and a second field of the two fields is a field other than the NDI field and a DCI format flag field.

19. The apparatus according to claim 18, wherein the second field is a HARQ process number field.

20. The apparatus according to claim 16, wherein a format of the DCI is format No and format N1.

* * * * *

UNITED STATES PATENT AND TRADEMARK OFFICE
CERTIFICATE OF CORRECTION

PATENT NO. : 11,856,582 B2
APPLICATION NO. : 17/171537
DATED : December 26, 2023
INVENTOR(S) : Luo et al.

It is certified that error appears in the above-identified patent and that said Letters Patent is hereby corrected as shown below:

In the Claims

In Column 34, in Claim 5, Line 8, delete "No" and insert -- N0 --.

In Column 34, in Claim 10, Line 47, delete "No" and insert -- N0 --.

In Column 35, in Claim 15, Line 8, delete "No" and insert -- N0 --.

In Column 36, in Claim 20, Line 18, delete "No" and insert -- N0 --.

Signed and Sealed this
Third Day of September, 2024

Katherine Kelly Vidal
*Director of the United States Patent and Trademark Office*